US012311681B2

(12) United States Patent
Yamada et al.

(10) Patent No.: US 12,311,681 B2
(45) Date of Patent: May 27, 2025

(54) MEDIUM TRANSPORT DEVICE AND RECORDING APPARATUS

(71) Applicant: SEIKO EPSON CORPORATION, Tokyo (JP)

(72) Inventors: Morihiko Yamada, Okaya (JP); Soichiro Kii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 18/047,351

(22) Filed: Oct. 18, 2022

(65) Prior Publication Data

US 2023/0120301 A1 Apr. 20, 2023

(30) Foreign Application Priority Data

Oct. 19, 2021 (JP) ................................ 2021-170783

(51) Int. Cl.

*B41J 29/13* (2006.01)
*B65H 5/00* (2006.01)
*G03G 21/16* (2006.01)

(52) U.S. Cl.

CPC ................ *B41J 29/13* (2013.01); *B65H 5/00* (2013.01); *B65H 2402/45* (2013.01); *G03G 21/1633* (2013.01)

(58) Field of Classification Search

CPC .. B41J 29/13; B41J 29/02; B65H 5/00; B65H 2402/45; B65H 2601/321; G03G 21/1633; G03G 21/1623; G03G 21/1619

See application file for complete search history.

(56) References Cited

U.S. PATENT DOCUMENTS

| | | | | |
|---|---|---|---|---|
| 7,386,255 | B2 | 6/2008 | Ochi | |
| 2004/0175210 | A1 | 9/2004 | Otaka | |
| 2007/0036585 | A1 * | 2/2007 | Ochi | G03G 21/1633 399/121 |
| 2015/0084272 | A1 * | 3/2015 | Maruyama | G03G 21/1633 271/226 |

FOREIGN PATENT DOCUMENTS

| | | |
|---|---|---|
| JP | 2001-019177 A | 1/2001 |
| JP | 2002-356244 A | 12/2002 |
| JP | 2004-269151 A | 9/2004 |
| JP | 2005-043809 | 2/2005 |
| JP | 2007-047571 | 2/2007 |

* cited by examiner

*Primary Examiner* — Sandra Brase

(74) *Attorney, Agent, or Firm* — WORKMAN NYDEGGER

(57) ABSTRACT

A medium transport device 1 including a device main body 12 having a transport path T for transporting a medium P, an outer door 30, an inner door 40 disposed with respect to the device main body 12 to the inside of the outer door 30, an outer hinge 31 that openably and closably attaches the outer door 30 to the device main body 12, and an inner hinge 41 that openably and closably attaches the inner door 40 to the device main body 12, wherein a pivot axis 15 of the outer hinge 31 and a pivot axis 5 of the inner hinge 41 both extend in a first direction and the outer hinge 31 and the inner hinge 41 overlap when viewed from a direction intersecting an outer door surface 30B of the outer door 30 in a closed state.

14 Claims, 22 Drawing Sheets

MEDIUM TRANSPORT DEVICE AND RECORDING APPARATUS

The present application is based on, and claims priority from JP Application Serial Number 2021-170783, filed Oct. 19, 2021, the disclosure of which is hereby incorporated by reference herein in its entirety.

BACKGROUND

1. Technical Field

The present disclosure relates to a medium transport device and a recording apparatus.

2. Related Art

In the related art, various configurations such as a recording apparatus have been used as a medium transport device that transports a medium. Among them, there is a medium transport device having an outer door and an inner door in order to cover the inside of the device main body and to enable access to the inside of the device body as needed. For example, JP-A-2002-356244 discloses a sheet transport device including an outer door section attached to a device main body and an inner door section attached to the outer door section.

In a medium transport device having an outer door and an inner door, it is desirable to variously change the state according to the type of work performed by a worker, such as when the outer door and the inner door are closed, when the outer door is opened and the inner door is closed, when the outer door is opened and the inner door is removed, or when the outer door and the inner door are opened. Here, in a configuration in which an inner door is attached to an outer door as in the sheet transport device of JP-A-2002-356244, it is sometimes difficult to close the inner door while the outer door is open. In addition, when the position of an outer hinge, which is the pivot axis of the outer door, and the position of an inner hinge, which is the pivot axis of the inner door, are separated from each other, then the device tends to be larger, so it is often desirable that the position of the outer hinge and the position of the inner hinge be near each other.

SUMMARY

In order to overcome the above-described problems, a medium transport device according to the disclosure includes a device main body having a transport path for transporting a medium, an outer door, an inner door disposed with respect to the device main body to the inside of the outer door, an outer hinge that openably and closably attaches the outer door to the device main body, and an inner hinge that openably and closably attaches the inner door to the device main body, wherein a pivot axis of the outer hinge and a pivot axis of the inner hinge both extend in a first direction and the outer hinge and the inner hinge overlap when viewed from a direction intersecting an outer door surface of the outer door in a closed state.

DESCRIPTION OF EMBODIMENT

Figure 1:
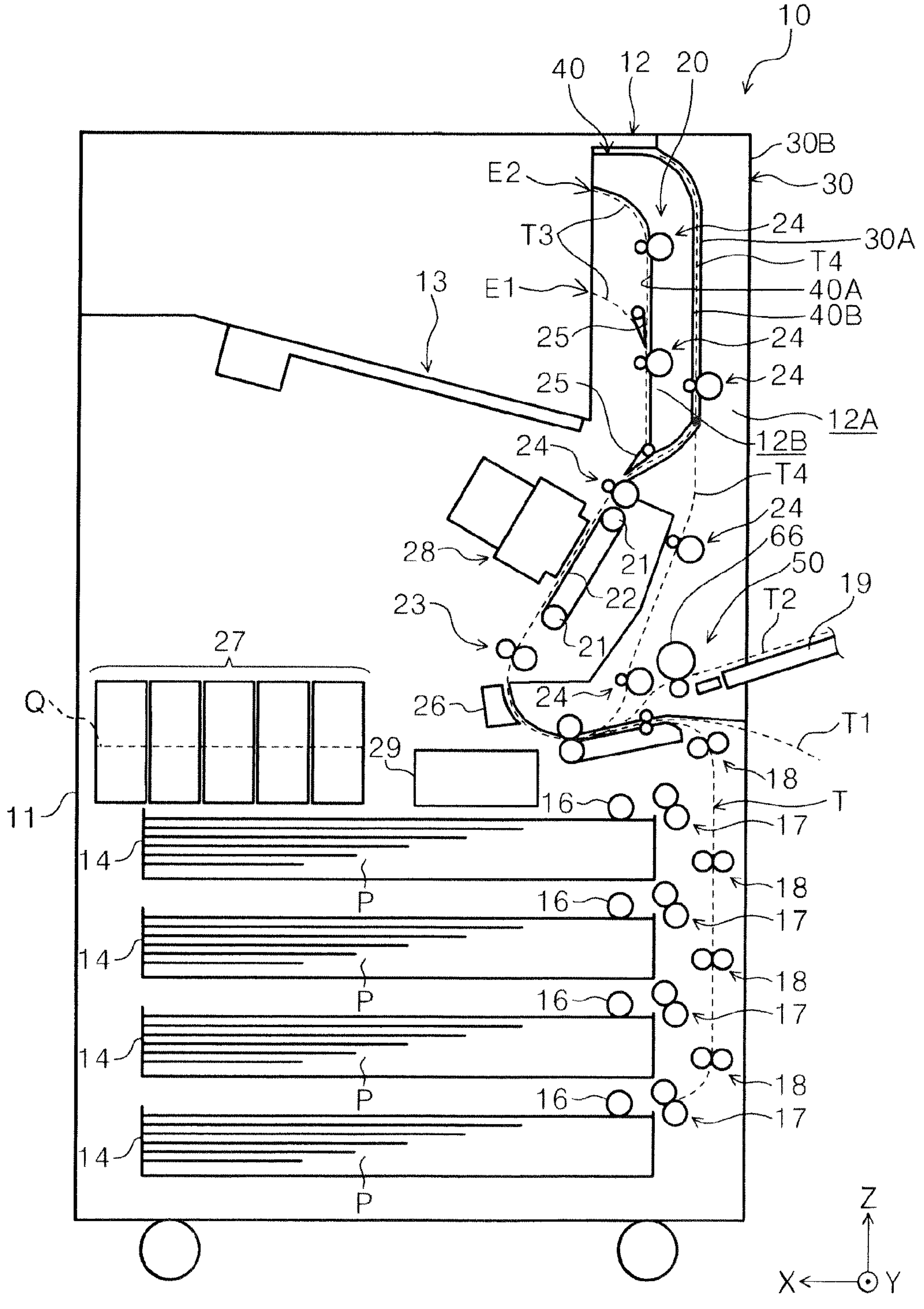
FIG. 1 is a configuration diagram showing internal configuration of an entire printer according to an embodiment.

The present disclosure will be described in general terms.

A medium transport device according to a first aspect includes a device main body having a transport path for transporting a medium, an outer door, an inner door disposed with respect to the device main body to the inside of the outer door, an outer hinge that openably and closably attaches the outer door to the device main body, and an inner hinge that openably and closably attaches the inner door to the device main body, wherein a pivot axis of the outer hinge and a pivot axis of the inner hinge both extend in a first direction and the outer hinge and the inner hinge overlap when viewed from a direction intersecting an outer door surface of the outer door in a closed state.

According to this aspect, the outer hinge and the inner hinge overlap when viewed from a direction intersecting an outer door surface of the outer door in a closed state. That is, since the position of the outer hinge and the position of the inner hinge are close to each other, the device can be miniaturized. Further, since both the outer door and the inner door are attached to the device main body, the outer door and the inner door can be brought into various states such as, in addition to a state in which the outer door and the inner door are closed and a state in which the outer door and the inner door are open, the inner door being removed while the outer door is in an open state, and a state in which the inner door is closed while the outer door is in an open state.

In a medium transport device according to a second aspect, with respect to the first aspect, the device main body has a fixing surface to which is fixed the inner hinge and the fixing surface is arranged so as to be inclined at an acute angle with respect to the outer door surface of the outer door in the closed state.

In general, when the position of the outer hinge and the position of the inner hinge are close to each other, it is difficult to remove the inner door while the outer door is attached. This is because the outer door becomes an obstacle and it is difficult to access the inner hinge. However, according to this aspect, the fixing surface is disposed so as to be inclined at an acute angle with respect to the outer door surface of the outer door in the closed state. For this reason, it is possible to suppress the likelihood of the outer door becoming an obstacle and making it difficult to access the inner hinge, and it is possible to easily remove the inner door in a state where the outer door is open.

In a medium transport device according to a third aspect, with respect to the first aspect, the device main body has a fixing surface for fixing the inner hinge by a fixing member and the fixing surface is arranged so that when the inner hinge is fixed by the fixing member, the fixing member does not interfere with the outer door in an open state.

According to this aspect, the fixing surface is arranged so that when the inner hinge is fixed by the fixing member, the fixing member does not interfere with the outer door in an open state. For this reason, it is possible to suppress a situation in which it is difficult to fix the inner hinge to the fixing surface due to the fixing member interfering with the outer door, and it is possible to easily remove the inner door in a state in which the outer door is open.

In a medium transport device according to a fourth aspect, with respect to any one of the first aspect to the third aspect, a regulation section is provided that regulates an opening angle of the outer door.

According to this aspect, the regulation section is provided that regulates the opening angle of the outer door. For this reason, it is possible to suppress the outer door from colliding with an external device, an external wall, or the like because the outer door is excessively opened.

In a medium transport device according to a fifth aspect, with respect to any one of the first aspect to the fourth aspect, the inner door in a closed state, together with the device main body, constitutes at least a portion of a first transport path of the transport path.

According to this aspect, the inner door in the closed state constitutes at least a portion of the first transport path together with the device main body. Since the inner door also serves the dual role of at least a portion of the first transport path, the apparatus configuration can be simplified. In addition, by opening the inner door together with the outer door, it is possible to easily remove the medium in a case where a transport failure of the medium occurs in the first transport path.

In a medium transport device according to a sixth aspect, with respect to the fifth aspect, the inner hinge is disposed outside a medium transport region of the first transport path, with respect to a width direction, which intersects a transport direction of the medium.

According to this aspect, the inner hinge is disposed to the outside of the medium transport region of the first transport path, with respect to a width direction. Therefore, it is possible to suppress the medium that is being transported in the first transport path, from being interfered with by the inner hinge.

In a medium transport device according to a seventh aspect, with respect to any one of the first aspect to the sixth aspect, the inner door in a closed state, together with the outer door in the closed state, constitutes at least a portion of a second transport path of the transport path.

According to this aspect, the inner door in the closed state constitutes at least a portion of the second transport path together with the outer door in the closed state. Since the inner door also serves the dual role of at least a portion of the second transport path, the apparatus configuration can be simplified. In addition, by opening the outer door, it is possible to easily remove the medium in a case where a transport failure of the medium occurs in the second transport path.

In a medium transport device according to an eighth aspect, with respect to any one of the first aspect to the seventh aspect, the inner door has an attachment surface for the inner hinge, the attachment surface, while the inner door is in the closed state, intersecting the outer door surface of the outer door in the closed state and the inner hinge is disposed so that, when viewed from a direction facing the attachment surface for the inner hinge, the inner hinge does not protrude from the attachment surface for the inner hinge.

According to this aspect, the inner hinge is disposed so that, when viewed from a direction facing the attachment surface for the inner hinge, the inner hinge does not protrude from the attachment surface for the inner hinge. Therefore, since interference of the inner hinge with the device main body and the outer door can be suppressed, the inner door can be arranged close to the device main body and the outer door, and the apparatus can be miniaturized.

In a medium transport device according to a ninth aspect, with respect to any one of the first aspect to the eighth aspect, the device main body includes a holding section configured to hold a first unit that is attachable and detachable after the inner door is removed, and the holding section is disposed, with the inner door in the closed state as a reference, on the opposite side than the outer door in the closed state.

According to this aspect, the device main body includes the holding section that holds the first unit that is attachable and detachable after removing the inner door. Therefore, various first units can be attached to the device main body. Although the holding section is, with reference to the inner door in the closed state, disposed on the opposite side than the outer door in the closed state, when the first unit is to be attached or detached, the inner door can be easily removed while the outer door is in the open state.

A medium transport device according to a tenth aspect, with respect to the ninth aspect, includes the first unit.

According to this aspect, the first unit is provided. Therefore, it is possible to perform various processes on the medium transported to the first unit.

In a medium transport device according to an eleventh aspect, with respect to the tenth aspect, the device main body is configured to connect a second unit to the first unit without removing the inner door and the first unit is a transport unit configured to transport the medium to the second unit.

According to this aspect, the first unit is configured to be connectable to the second unit and is a transport unit that transports the medium to the second unit. Therefore, it is possible to perform various processes on the medium transported to the second unit via the transport unit.

A medium transport device according to a twelfth aspect, with respect to the eleventh aspect, includes the second unit, wherein the second unit is configured to transport the medium to an external apparatus.

According to this aspect, it is possible to transport the medium to an external device. Therefore, various processes can be performed on the medium transported to the external apparatus.

A recording apparatus according to a thirteenth aspect includes the medium transport device according to any one of the first aspect to the eleventh aspect and a recording unit that performs recording on the medium.

According to this aspect, in the recording apparatus having the outer door and the inner door, it is possible to bring the outer door and the inner door into various states, such as bringing the inner door into a closed state in a state where the outer door is opened, while suppressing an increase in size of the apparatus.

Hereinafter, as an embodiment, a specific example of a recording apparatus as an example of a medium transport device according to the disclosure will be described. FIGS. 1 to 22 show a printer 10, which is a recording apparatus, or a portion of the printer 10. The printer 10 is configured as an ink jet type apparatus that performs recording by ejecting ink Q, which is an example of liquid, onto sheet P, which is an example of a medium. An X-Y-Z coordinate system shown in the drawings is an orthogonal coordinate system. The X direction is the width direction of the apparatus as viewed by an operator of the printer 10, and is a horizontal direction. The arrow direction in the X direction is defined as a +X direction, and the direction opposite to the arrow direction is defined as a −X direction. The Y direction is a width direction intersecting the transport direction of the sheet P and also an apparatus depth direction, and is a horizontal direction. An arrow direction in the Y direction is defined as a +Y direction, and a direction opposite to the arrow direction is defined as a −Y direction. The Z direction is an example of an apparatus height direction and is a vertical direction. An upper arrow direction in the Z direction is defined as a +Z direction, and a lower arrow direction in the Z direction opposite to the arrow direction is defined as a −Z direction. In the present embodiment, "upward" means a direction including an upward component in the Z direction. "Downward" means a direction including a downward component in the Z direction.

As shown in FIG. 1, sheet P is transported in the printer 10 through a transport path T, indicated by broken line. The direction in which the sheet P is transported in the transport path T is different in each section of the transport path T. The printer 10 includes a device main body 12, a transport section 20, a feeding section 50, and a line head 28.

Figure 2:
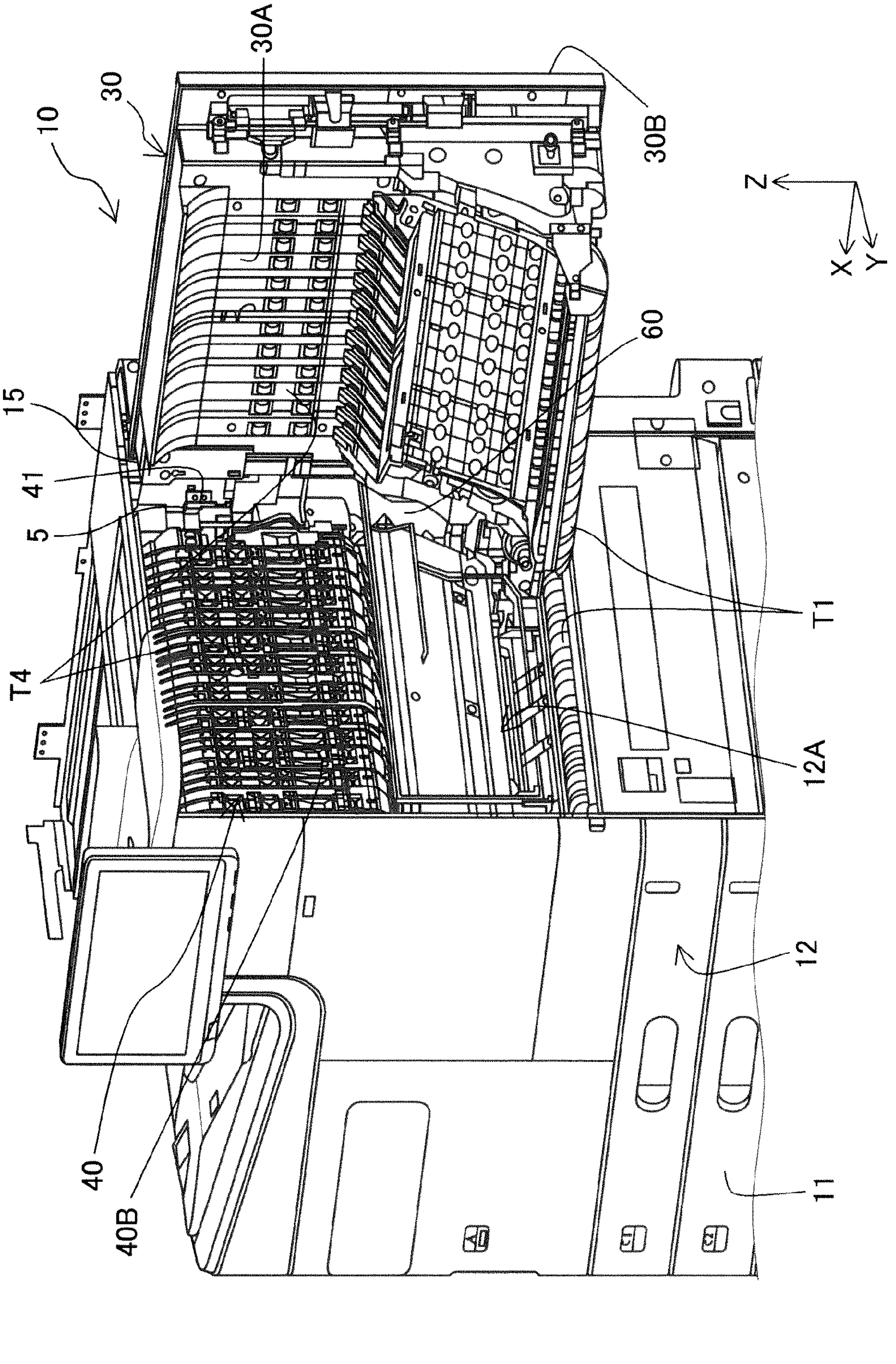
FIG. 2 is a perspective view showing the printer of FIG. 1 in a state in which an inner door is closed and an outer door is open.

The device main body 12 includes a case 11 serving as an outer shell and a plurality of frames 60 shown in FIG. 2 and the like. A discharge section 13 including a space to which recorded sheets P are discharged is formed in the +Z direction from the Z direction center of the device main body 12. The device main body 12 is provided with a plurality of paper cassettes 14. An outer opening 12A, which opens in the X direction. is formed at an −X direction end section of the device main body 12. The device main body 12 is provided with an outer door 30, which is a door that opens and closes to open and close the outer opening 12A.

Figure 3:
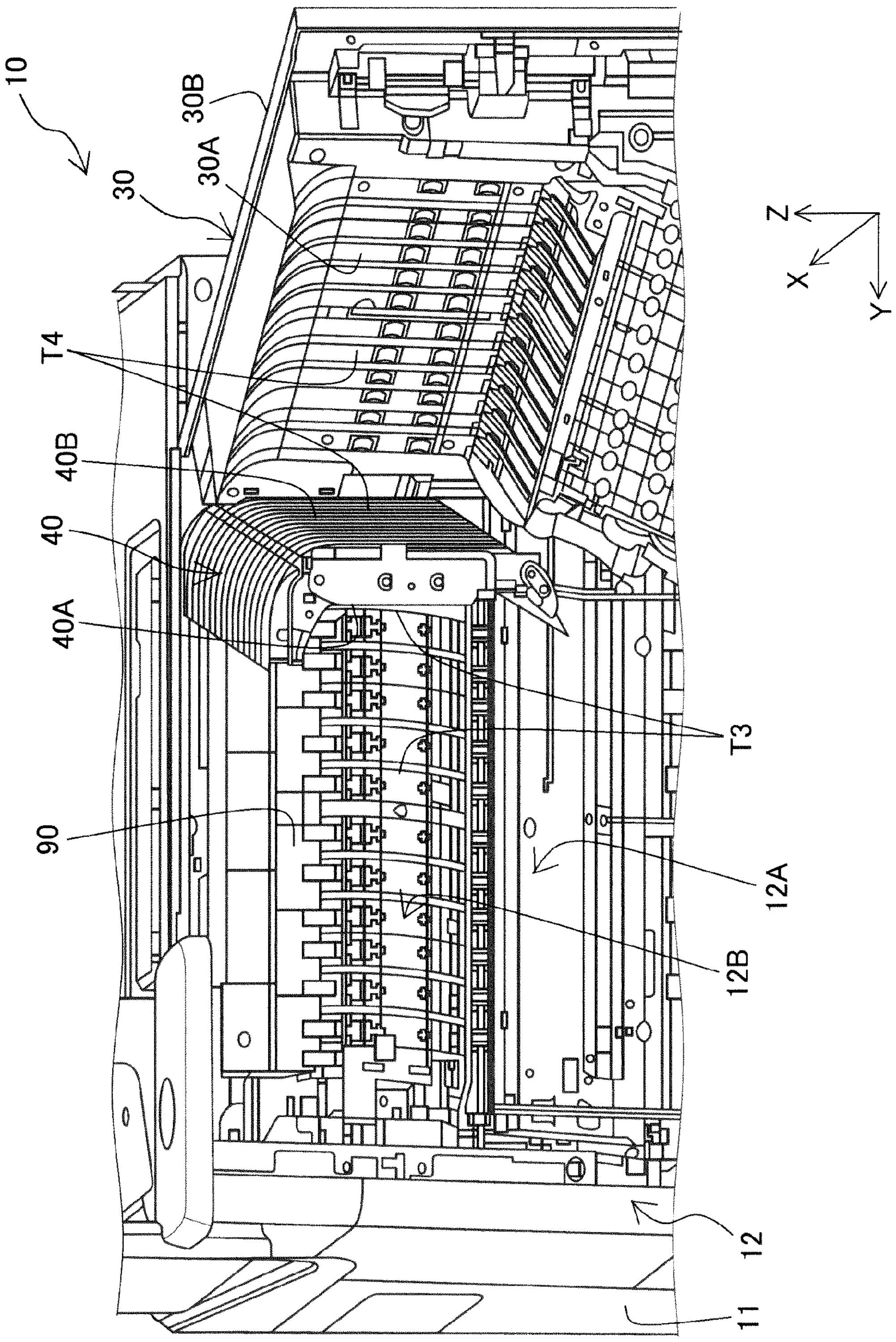
FIG. 3 is a perspective view showing the printer of FIG. 1 in a state in which the outer door and the inner door are open.
Figure 4:
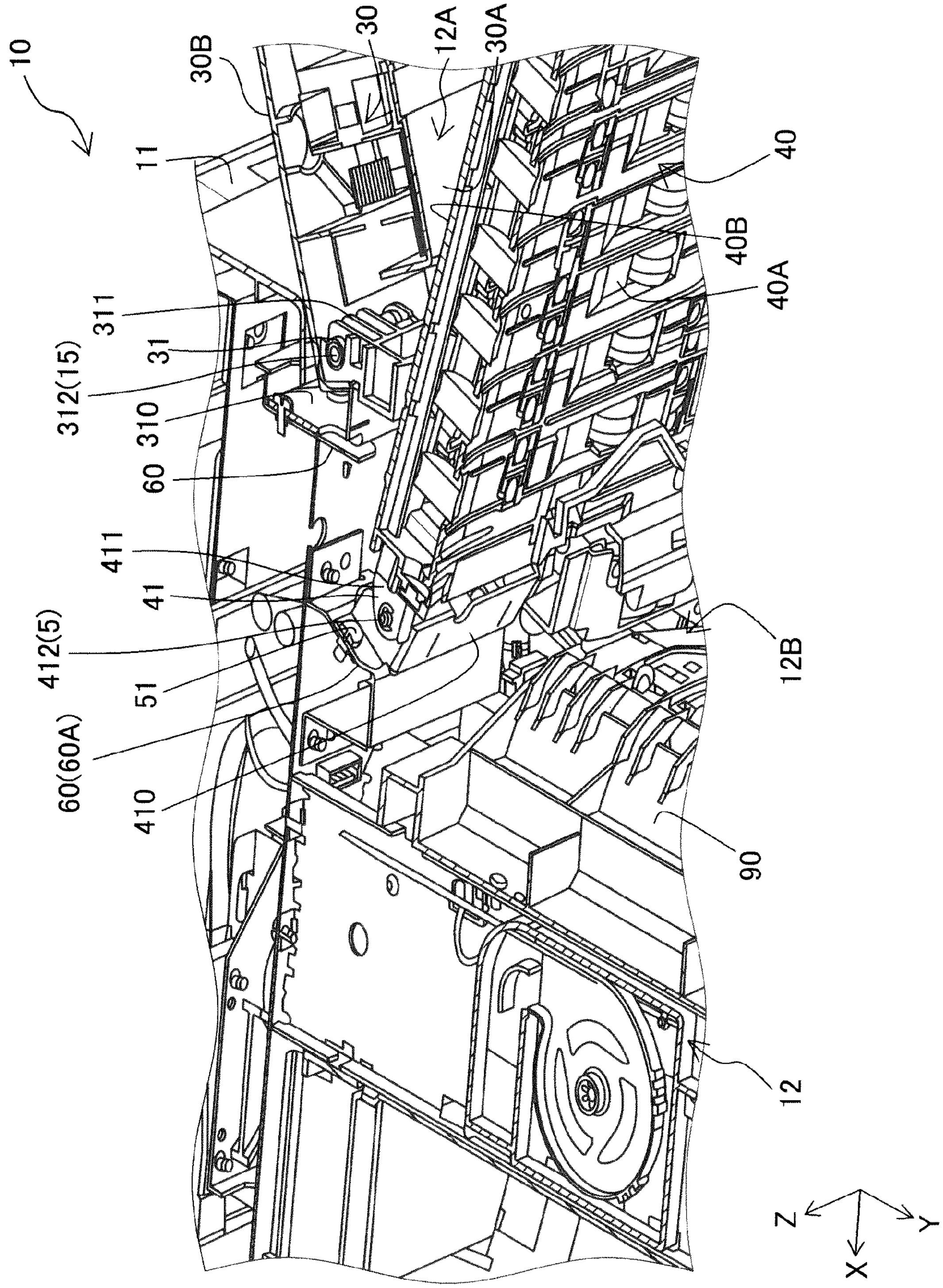
FIG. 4 is a perspective cross-sectional view showing the printer of FIG. 1 in a state in which the outer door and the inner door are open.
Figure 5:
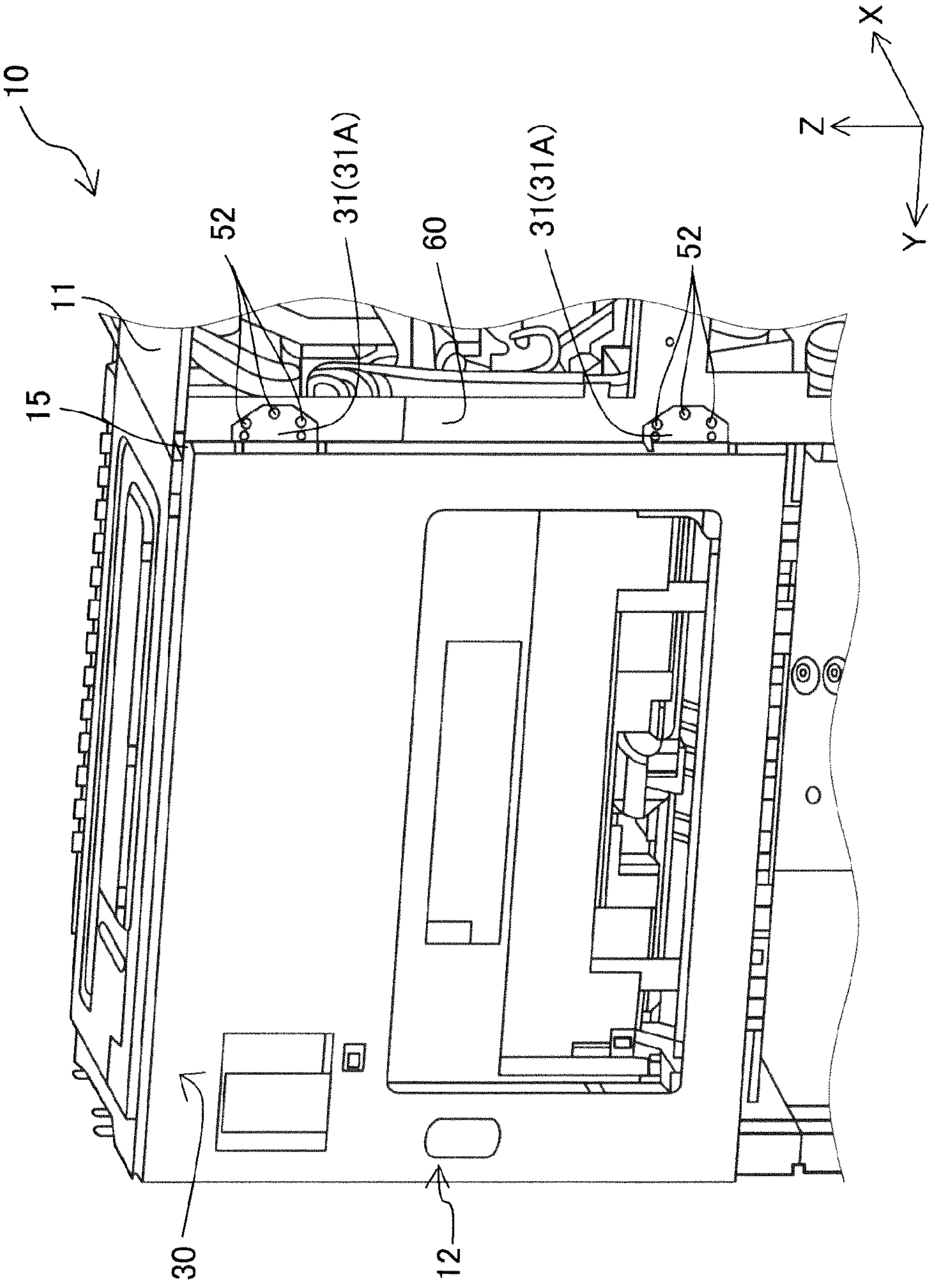
FIG. 5 is a perspective view showing the printer of FIG. 1 in a state in which the inner door and the outer door are closed and a portion of a cover is removed.

As shown in FIGS. 2 to 4, the outer door 30 is formed in a substantially plate shape having a predetermined thickness. As shown in FIGS. 4 and 5 and the like, the outer door 30 includes, as a pivot axis 15 along the Z direction, outer hinges 31 provided at an end section of the device main body 12 that is the −X direction end section and the −Y direction end section. Thus, the outer door 30 is pivotable about an axis along the Z direction. The outer door 30 can open and close a portion of an inversion path T4 and a transport path T1, which are a portion of the transport path T, by opening or closing the outer opening 12A as the outer door 30 pivots around the pivot axis 15. In other words, the outer door 30 is pivotable between an open position, in which a portion of the transport path T1 and the inversion path T4 is exposed, and a closed position, in which the transport path T1 and the inversion path T4 are hidden. As shown in FIG. 1 and the like, a portion of the outer door 30 forms the transport path T1, and another portion thereof forms the inversion path T4.

In addition, the device main body 12 is provided with an inner door 40, which is a door that opens and closes, at the inner side, which is to the +X direction side of the outer door 30, that is, at the inner side of the outer opening 12A. As shown in FIGS. 3 and 4 and the like, the inner door 40 is formed in a substantially plate shape having a predetermined thickness. As shown in FIG. 4 and the like, the inner door 40 includes, as a pivot axis 5 along the Z direction, an inner hinge 41 provided at an end section of the device main body 12, which is the −X direction end section and the −Y direction end section, that is, at a position close to the outer hinges 31. As a result, the inner door 40 is pivotable around an axis along the Z direction. The inner door 40 can open and close a portion of the inversion path T4 and the transport path T1, which are portions of the transport path T, by opening or closing the inner opening 12B as the inner door 40 pivots around the pivot axis 5. In other words, the outer door 30 is pivotable between an open position, in which a portion of a transport path T3 is exposed, and a closed position, in which the transport path T3 is hidden. As shown in FIG. 1 and the like, a portion of the inner door 40 forms the transport path T3, and another portion thereof forms the inversion path T4. Using a different expression, the inner door 40 constitutes at least a portion of the transport path T3, as a first transport path, and the inversion path T4, as a second transport path.

As shown in FIG. 1, sheets P are stored in the plurality of paper cassettes 14. The sheets P stored in the paper cassettes 14 are transported along the transport path T by pick up rollers 16 and transport roller pairs 17 and 18. The transport path T1, which is for transporting sheets P from an external apparatus (not shown), and a transport path T2, which is for transporting, via a feed roller 66, sheets P from a manual feed tray 19 provided in the device main body 12, merge with the transport path T. A section in the −X direction from the X direction center of the printer 10 is configured as a transport section 20 that transports the sheet P. The feeding section 50 is provided at a −X direction end section of the printer 10 in a peripheral section of the manual feed tray 19. A sheet P on the manual feed tray 19 is fed along the transport path T2 by the feeding section 50, and then transported along the transport path T by the transport section 20.

The transport section 20 includes a transport belt 22 wound around two pulleys 21, a registration roller pair 23 that performs skew correction or the like of the sheet P, pairs of transport rollers 24 that transport the sheets P, a plurality of flaps 25 that switch the paths through which the sheets P are transported, and a medium width detection unit 26 that detects the Y direction width of the sheets P. A transport path T3 toward the discharge section 13 and a inversion path T4 for reversing the front and back of sheets P are provided at the downstream side of the transport belt 22 in the transport path T. Note that when the inner door 40 in the closed state as shown in FIG. 1, the surface 40A on the +X direction side configures the transport path T3 together with the device main body 12, and the surface 40B on the −X direction side configures the inversion path T4 together with the surface 30A on the +X direction side of the outer door 30 in the closed state.

The transport path T3 is provided with a discharge port E1 and a discharge port E2 through which sheets P are discharged. However, in the state of FIG. 1, sheets P can be discharged from the discharge port E1 to the discharge section 13 by the flap 25. The printer 10 of this embodiment has a configuration in which various units can be mounted on the +X direction side of the inner opening 12B in the device main body 12, and various processes can be executed on sheets P discharged from the discharge port E1 and the discharge port E2 by mounting a desired unit.

In addition, the device main body 12 is provided with an ink tank 27, which stores the ink Q, and a control section 29, which is a control circuit board which controls the operation of each section of the printer 10. The line head 28 is at a position downstream from the medium width detection unit 26 in the transport direction of the sheets P and at a position facing the transport belt 22. The line head 28 is an example of a recording section, and performs recording by ejecting ink Q supplied from the ink tank 27 onto sheets P fed from the feeding section 50.

The control section 29 is configured to include a central processing unit (CPU), a read only memory (ROM), a random access memory (RAM), and a storage, none of which are shown, and controls transport of the sheets P in the printer 10 and operations of sections including the line head 28, the transport section 20, and the feeding section 50.

How the outer door 30 and the inner door 40 are attached to the device main body 12 will be described next with reference to FIGS. 5 to 10. Specifically, the configuration and arrangement of the outer hinges 31 for attaching the outer door 30 to the device main body 12 and the inner hinge 41 for attaching the inner door 40 to the device main body 12 will be mainly described.

Figure 7:
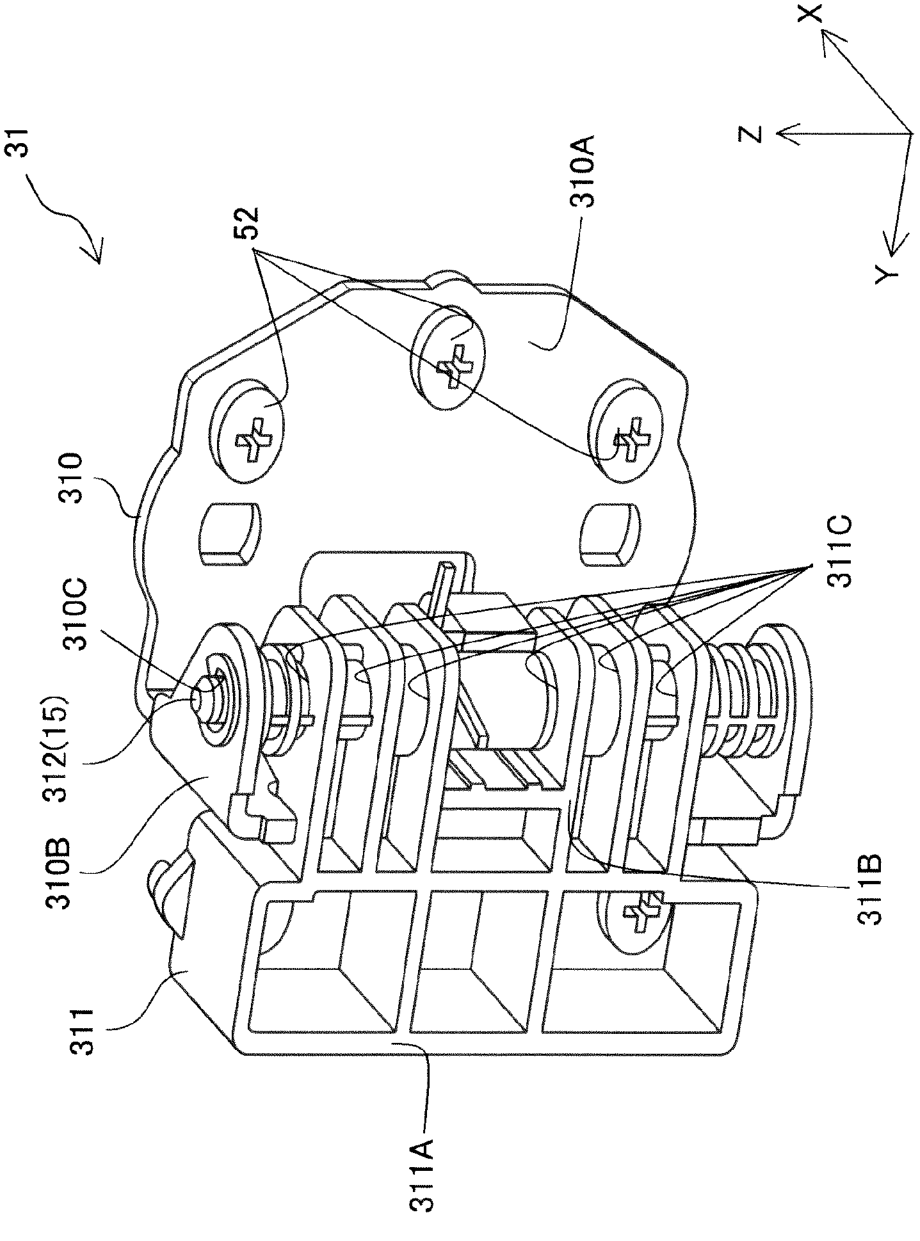
FIG. 7 is a perspective view showing an outer hinge.
Figure 8:
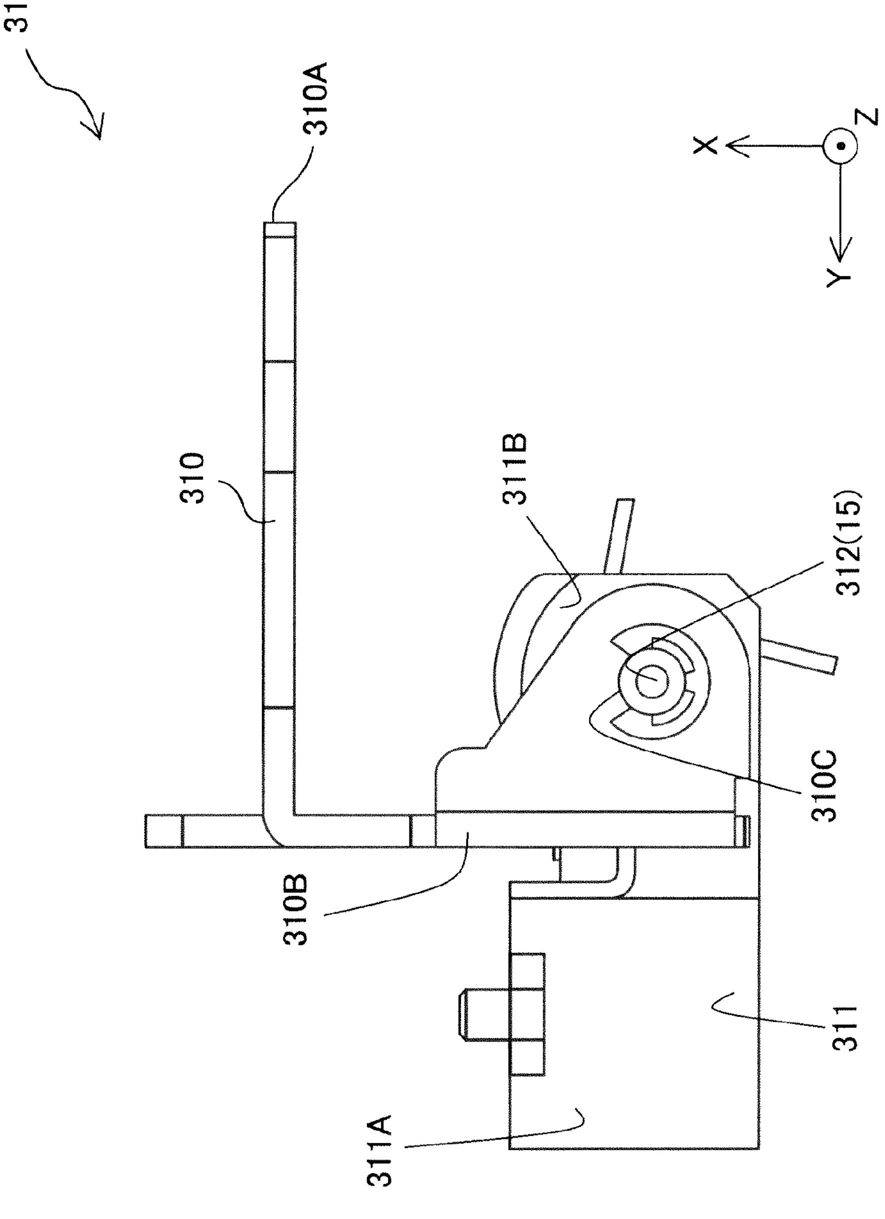
FIG. 8 is a plan view showing the outer hinge.

FIG. 5 is a diagram in which the case 11 is partially removed, and as shown in FIG. 5, in the printer 10, outer hinges 31 are attached to a frame 60 at two locations at the −X direction side/−Y direction side end section of the device main body 12. As shown in FIGS. 7 and 8, the outer hinges 31 include a frame fixing section 310 fixed to the frame 60 and an outer door fixing section 311 fixed to the outer door 30. The frame fixing section 310 includes a flat plate section 310A screwed to the frame 60 with screws 52, a flat plate section 310B perpendicular to the flat plate section 310A in a plan view viewed from the Z direction, and holes 310C provided at two positions of a +Z direction side end section and a −Z direction side end section of the flat plate section 310B. In addition, the outer door fixing section 311 includes a screw on section 311A, which is screwed onto the outer door 30, and a hole formation section 311B, in which a plurality of holes 311C are provided. Also, a rod-shaped member 312 is provided which, in a state of passing from the hole 310C at the +Z direction side end section and through the plurality of holes 311C, passes to the hole 310C at the −Z direction side end section. The rod-shaped member 312 forms the pivot axis 15.

Here, as shown in FIG. 5, in the printer 10 of the embodiment, since the outer hinges 31 can be exposed while the outer door 30 is closed, the outer hinges 31 can be attached to and detached from the device main body 12 from the outside while the outer door 30 is closed. With this configuration, the components of the printer 10 can be effectively disposed to the inside of the outer door 30. This is because in a configuration in which the outer hinges 31 are attached to and detached from the outer opening 12A side, which is to the inside with respect to the device main body 12, while in a state in which the outer door 30 is opened, without being able to attach or detach the outer hinges 31 to or from the device main body 12 from the outside in a state in which the outer door 30 is closed, it is difficult to access the outer hinges 31 depending on the arrangement of the components of the printer 10 inside the outer door 30.

Figure 6:
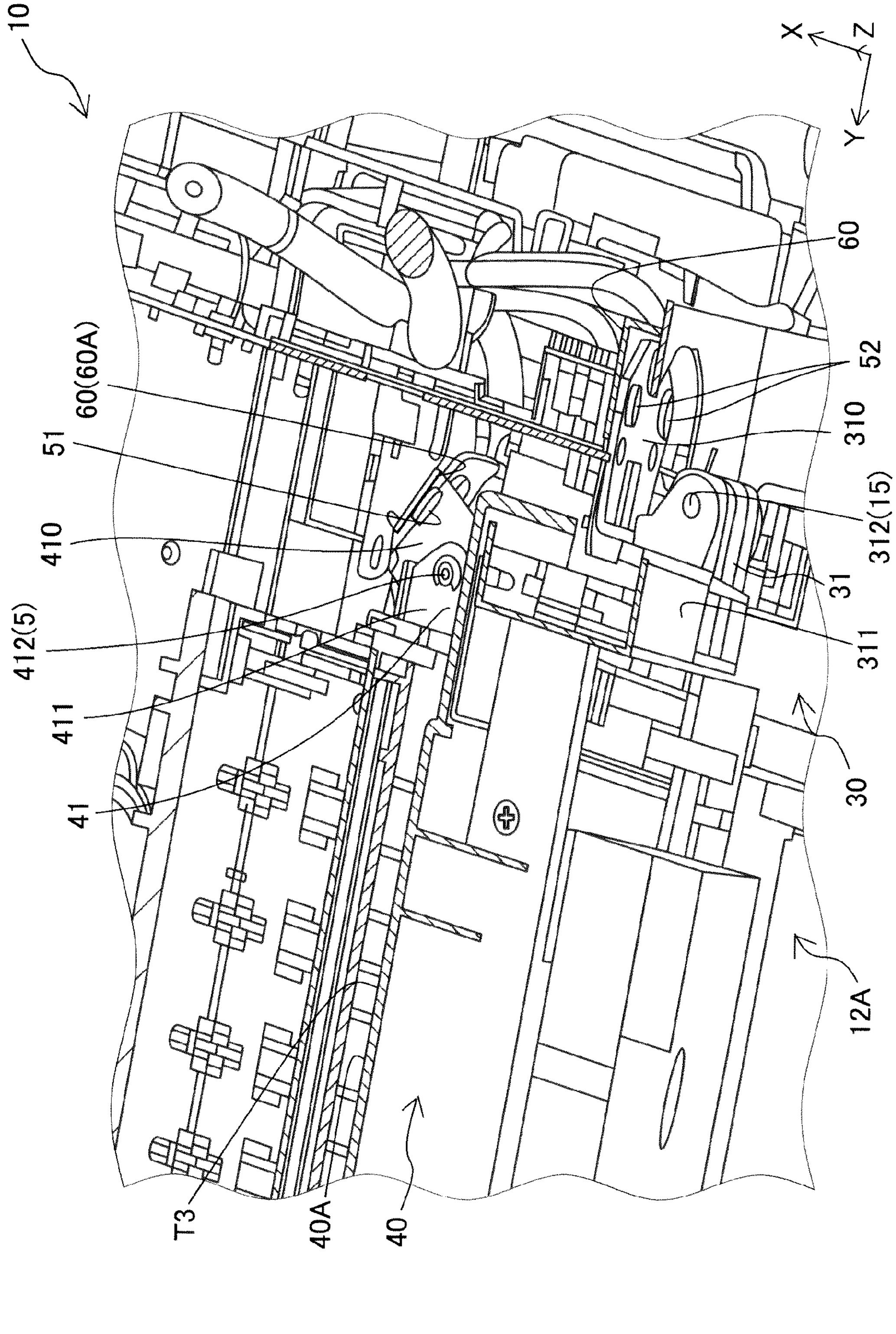
FIG. 6 is a cross-sectional view showing the printer shown in FIG. 1 in a state in which the inner door is closed and the outer door is open.
Figure 9:
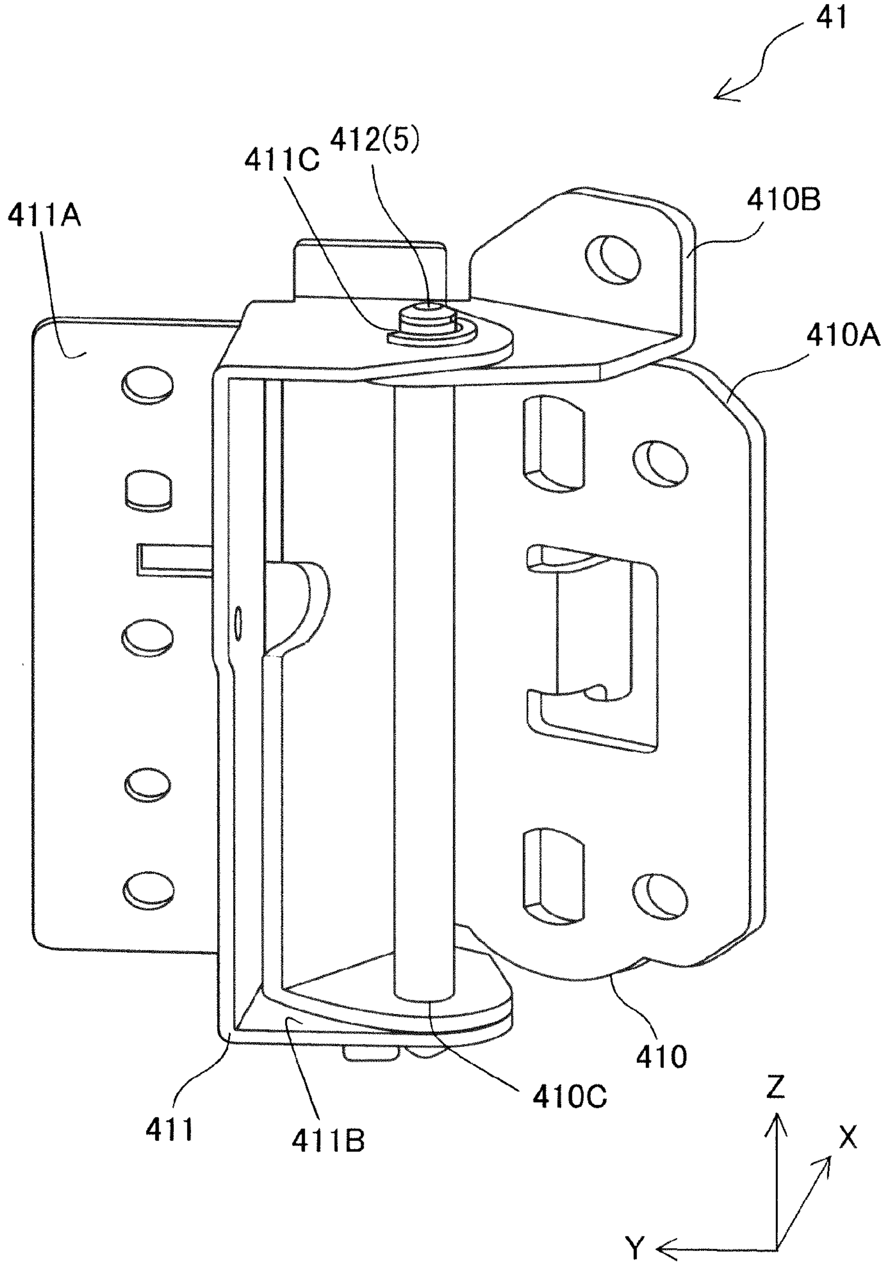
FIG. 9 is a perspective view showing an inner hinge.
Figure 10:
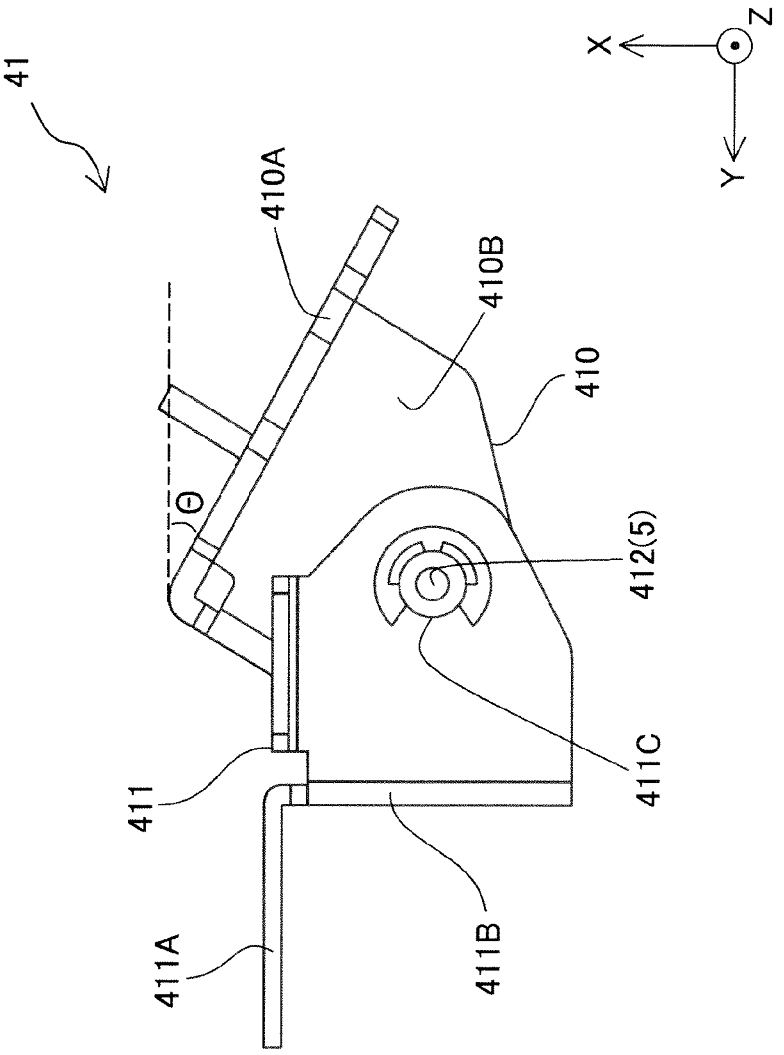
FIG. 10 is a plan view showing the inner hinge.

As shown in FIG. 6, the inner hinge 41 is attached in the vicinity of an outer hinge 31. Specifically, the inner hinge 41 is attached to the frame 60 at an end section on the −X direction side and the −Y direction side of the device main body 12, at a position overlapping the outer hinge 31 when viewed from the X direction. As described above, since the inner hinge 41 is provided on the same side of the device main body 12 as the outer hinge 31, the inner door 40 can be automatically closed by closing the outer door 30 from a state where both the outer door 30 and the inner door 40 are opened. In addition, since both the outer door 30 and the inner door 40 are attached to the end section to the −X direction side and to the −Y direction side of the device main body 12, the worker can access the outer opening 12A from the +Y direction side, which is the front surface side, and it is possible to suppress the outer door 30 from being an obstacle to the operation. Note that although the frame 60 to which the outer hinge 31 is attached and the frame 60 to which the inner hinge 41 is attached are separate frames, they may be attached to the same frame 60. As shown in FIGS. 9 and 10, the inner hinge 41 includes a frame fixing section 410 fixed to the frame 60 and an inner door fixing section 411 fixed to the inner door 40. The frame fixing section 410 includes a flat plate section 410A to be screwed to the frame 60, and a hole formation section 410B in which holes 410C are provided at two positions of a +Z direction side end section and a −Z direction side end section. In addition, the inner door fixing section 411 has a flat plate section 411A which is screwed to the inner door 40, and a hole formation section 411B in which holes 411C are provided at two positions of a +Z direction side end section and a −Z direction side end section. In addition, a rod-shaped member 412 is provided which, in a state of passing from the hole 410C at the +Z direction side end section of the flat plate section 411A and through the hole 410C in the hole formation section 411B, passes to the hole 411C at the −Z direction side end section of the flat plate section 411A. The rod-shaped member 412 forms a pivot axis 5.

Here, as shown in FIG. 6, in the printer 10 of the present embodiment, a fixing surface 60A of the frame 60, to which the inner hinge 41 is fixed, is disposed at an acute angle in plan view with respect to the Y direction, that is, with respect to the outer door surface 30B of the outer door 30 in the closed state. Note that in the printer 10 of this embodiment, as shown in FIG. 10, the acute angle Θ is 30°, and is preferably 30° to 45°, but is not limited to this range of angles.

In summary, the printer 10 of the present embodiment includes the device main body 12 having the transport path T for transporting the sheet P, the outer door 30, the inner door 40 disposed to the inside of the outer door 30 with respect to the device main body 12, the outer hinge 31 for openably and closably attaching the outer door 30 to the device main body 12, and the inner hinge 41 for openably and closably attaching the inner door 40 to the device main body 12. The pivot axis 15 of the outer hinge 31 and the pivot axis 5 of the inner hinge 41 both extend in the Z direction as a first direction, and the outer hinges 31 and the inner hinge 41 are disposed at positions overlapping each other when viewed from the X direction, which is a direction intersecting the outer door surface 30B of the outer door 30 in the closed state.

In this way, by arranging the outer hinge 31 and the inner hinge 41 at positions that overlap when viewed from the X direction, the position of the outer hinge 31 and the position of the inner hinge 41 can be close to each other, so that the device can be made smaller. Further, since both the outer door 30 and the inner door 40 are attached to the device main body 12, the outer door 30 and the inner door 40 can be brought into various states such as, in addition to a state in which the outer door 30 and the inner door 40 are closed and a state in which the outer door 30 and the inner door 40 are open, the inner door 40 being removed while the outer door 30 is in an open state, and a state in which the inner door 40 is closed while the outer door 30 is in an open state. Note that "the outer hinges 31 and the inner hinge 41 are arranged at positions overlapping each other when viewed from the X direction" includes not only an arrangement in which the outer hinges 31 and the inner hinge 41 completely overlap each other when viewed from the X direction but also an arrangement in which the outer hinges 31 and the inner hinge 41 only partially overlap each other when viewed from the X direction.

Here, from another point of view, in addition to being a medium transport device, the printer 10 according to the embodiment is a recording apparatus including the line head 28 that performs recording on sheets P. Therefore, in the recording apparatus having the outer door 30 and the inner door 40, it is possible to bring the outer door 30 and the inner door 40 into various states, such as bringing the inner door 40 into a closed state in a state where the outer door 30 is opened, while suppressing an increase in size of the apparatus.

Further, as described above, the device main body 12 has the fixing surface 60A for fixing the inner hinge 41, and the fixing surface 60A is arranged to be inclined at an acute angle with respect to the outer door surface 30B of the outer door 30 in the closed state. In general, when the position of the outer hinge 31 and the position of the inner hinge 41 are close to each other, it is difficult to remove the inner door 40 while the outer door 30 is attached. This is because the outer door 30 becomes an obstacle and it is difficult to access the inner hinge 41. However, in the printer 10 of the present embodiment, the fixing surface 60A is disposed so as to be inclined at an acute angle with respect to the outer door surface 30B of the outer door 30 in the closed state. For this reason, it is possible to suppress the likelihood of the outer door 30 becoming an obstacle and making it difficult to access the inner hinge 41, and it is possible to easily remove the inner door 40 in a state where the outer door 30 is open.

Figure 13:
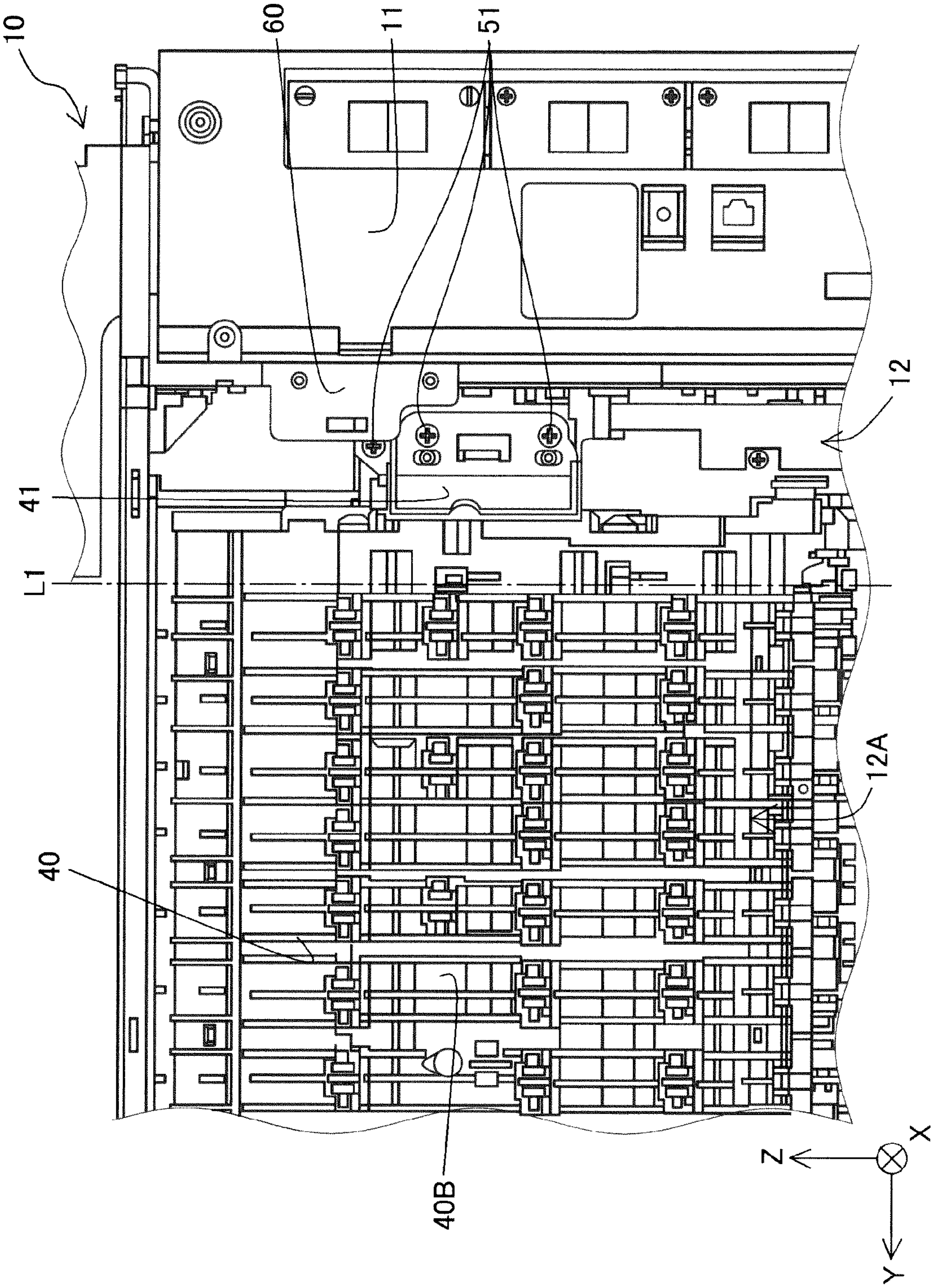
FIG. 13 is a side view of the printer shown in FIG. 1, in which the outer door is omitted.

Further, from another viewpoint, as shown in FIG. 6 and FIG. 13 (to be described later), the device main body 12 has a fixing surface 60A for fixing the inner hinge 41 by screws 51 as fixing members, and the fixing surface 60A is arranged so that the screws 51 do not interfere with the outer door 30 in an opened state when the inner hinge 41 is being fixed by the screws 51. For this reason, in the printer 10 of the present embodiment, it is possible to suppress a situation in which it is difficult to fix the inner hinge 41 to the fixing surface 60A due to the screws 51 interfering with the outer door 30, and it is possible to easily remove the inner door 40 in a state in which the outer door 30 is open. Note that the arrangement in which the fixing member does not interfere with the outer door 30 includes not only a case in which the fixing member itself does not interfere with the outer door 30, but also a case in which a tool such as a screw driver can be prevented from interfering when the fixing member is the screws 51 as in the printer 10 of the present embodiment.

Figure 11:
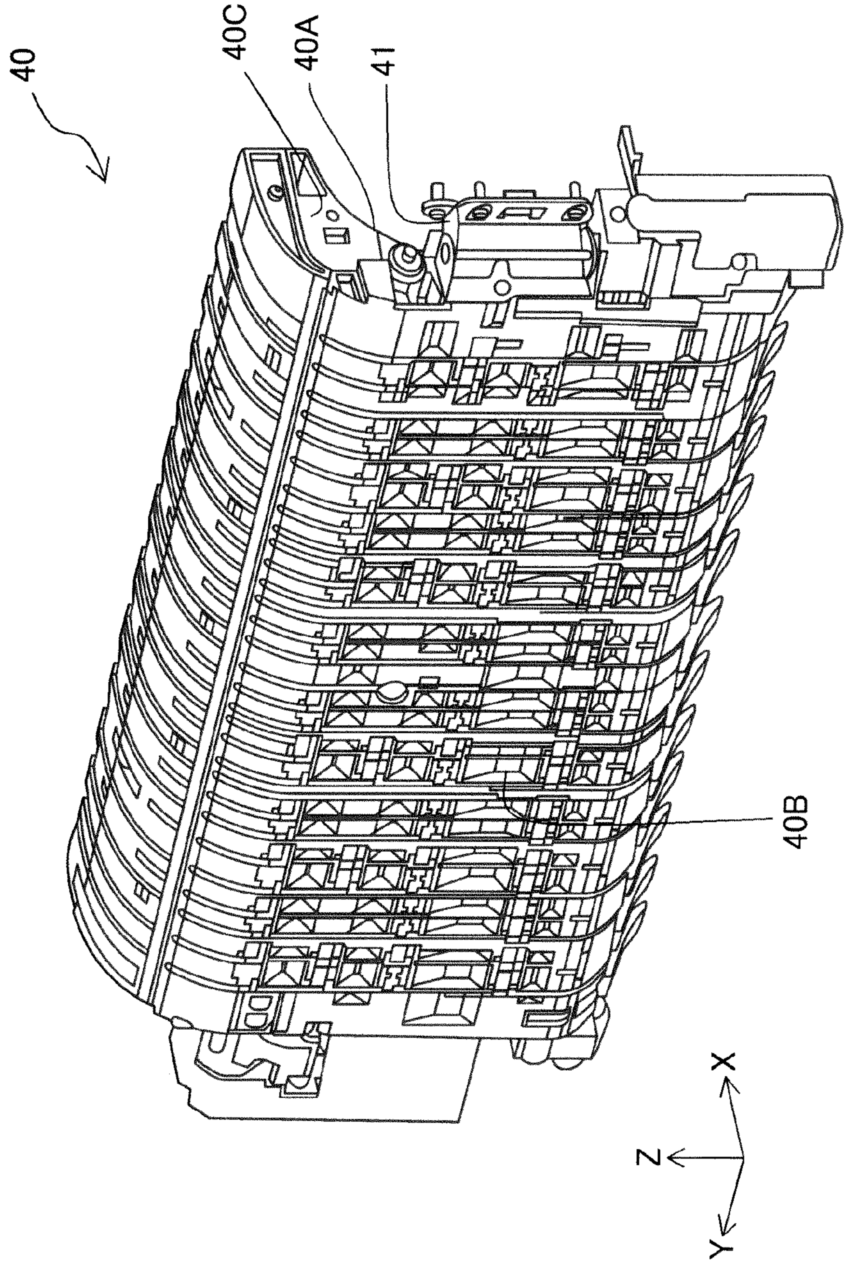
FIG. 11 is a perspective view showing the inner door.
Figure 12:
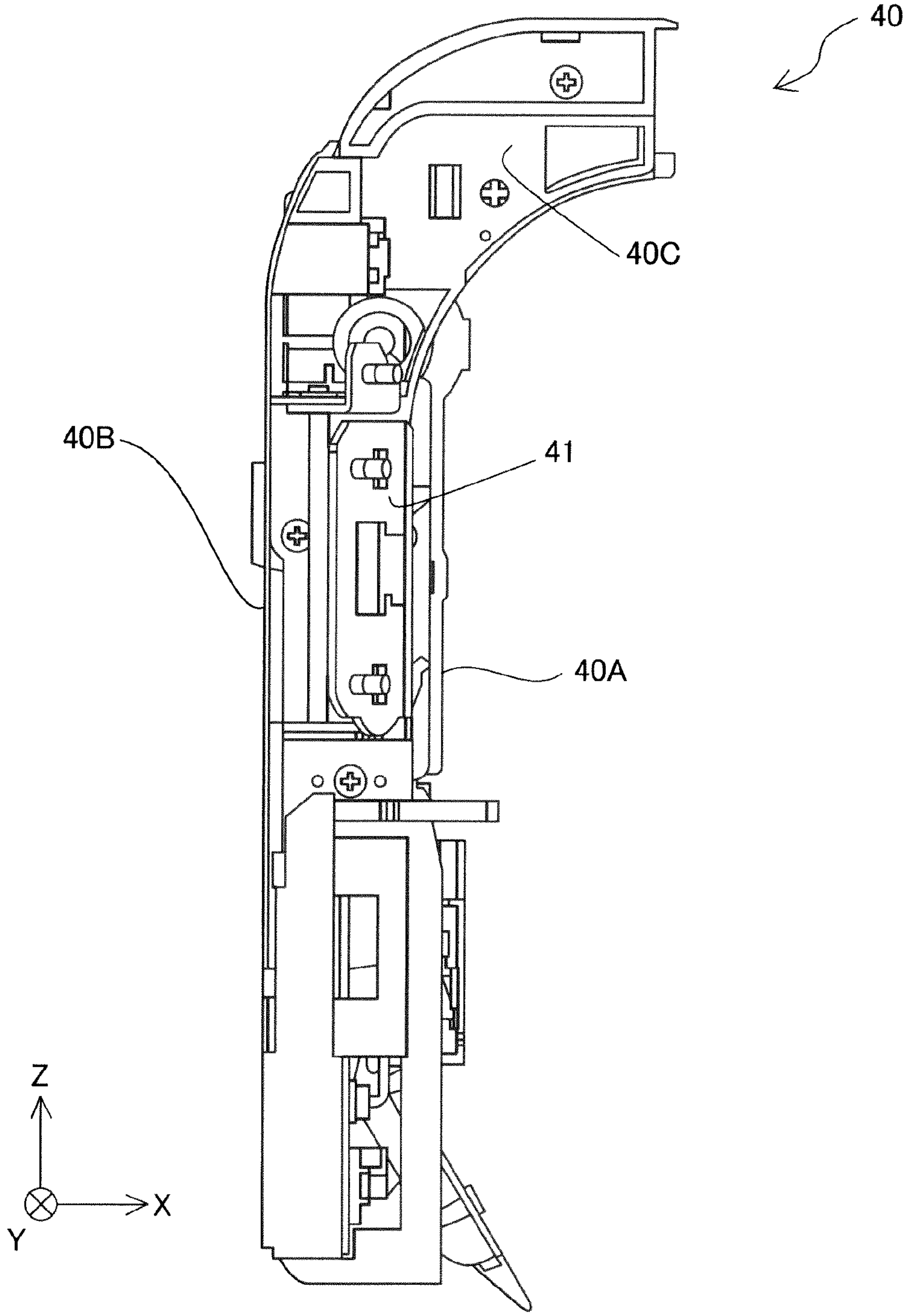
FIG. 12 is a rear view showing the inner door.

Hereinafter, the arrangement and configuration of the outer door 30 and the inner door 40 will be described in more detail with reference to FIGS. 11 to 17. As shown in FIGS. 11 and 12, the inner door 40 has a substantially flat plate shape having a surface 40A and a surface 40B that face opposite directions, and the inner hinge 41 is attached by being screwed to an attachment surface 40C, which is positioned at the −Y direction side end section of the surface 40A and the surface 40B.

Figure 14:
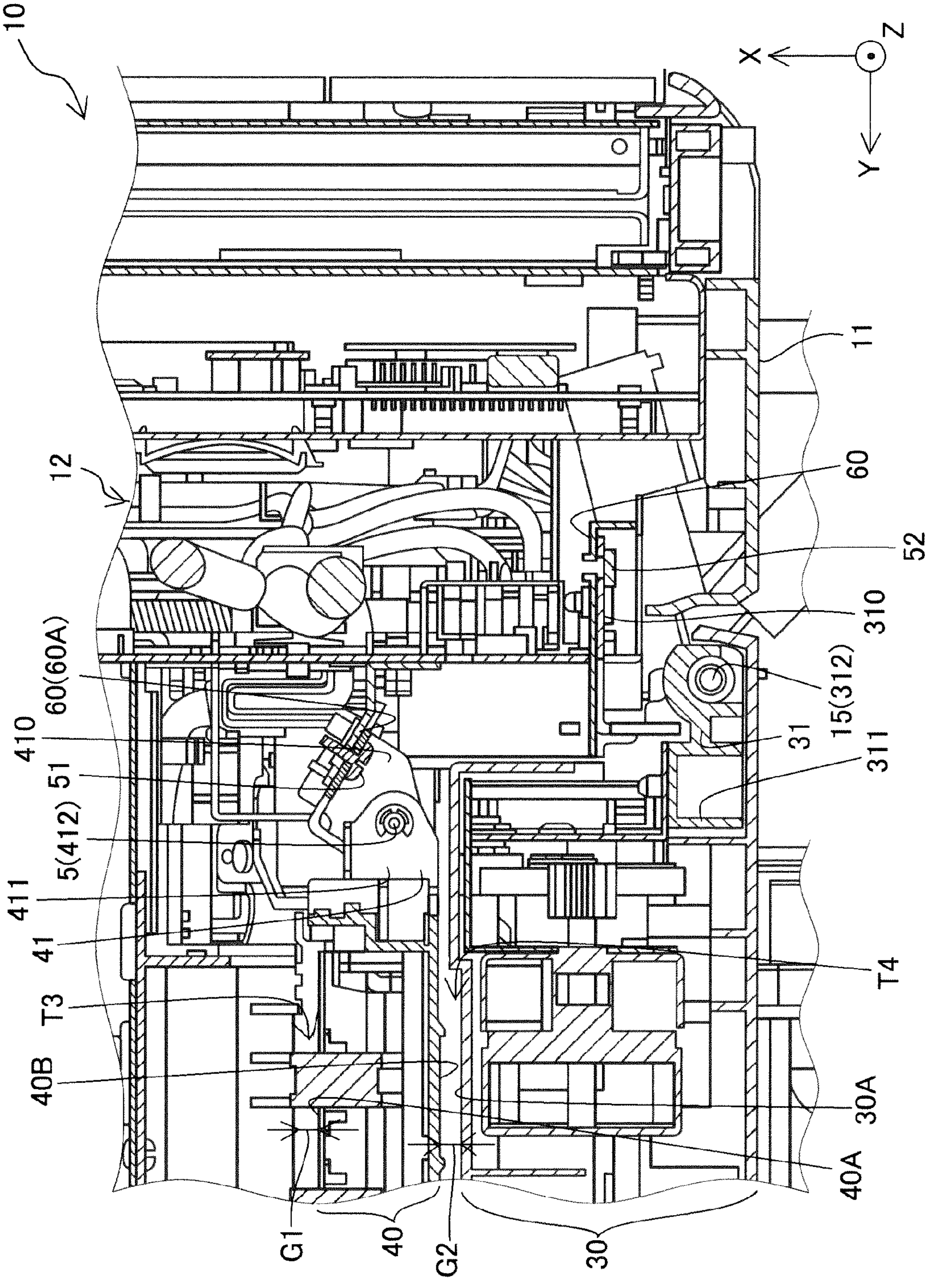
FIG. 14 is a cross-sectional view around an inner hinge and an outer hinge showing a state in which the inner door and the outer door are closed.

Using a different expression, the inner door 40 has the attachment surface 40C of the inner hinge 41, which is the X-Z plane that, when the inner door 40 is in the closed state, intersects with the Y-Z plane, which is the outer door surface 30C of the outer door 30 in the closed state. As shown in FIG. 12, the inner hinge 41 is disposed so as not to protrude from the attachment surface 40C when viewed from the Y direction, which is a direction facing the attachment surface 40C. With such a configuration, interference of the inner hinge 41 with the device main body 12 or the outer door 30 can be suppressed. Therefore, in the printer 10 of the present embodiment, as shown in FIG. 14, the inner door 40 can be disposed close to the device main body 12 and the outer door 30, and the apparatus can be miniaturized. As shown in FIG. 14, the gap G1 between the inner door 40 and the device main body 12 constitutes the transport path T3 as the first transport path, and the gap G2 between the inner door 40 and the outer door 30 constitutes the inversion path T4 as the second transport path, but the gap G1 and the gap G2 can be configured to be narrow.

The printer 10 of this embodiment can use sheets P of various sizes, but the position that corresponds to the end in the −Y direction, which is the widthwise direction of the sheet P, when the largest sheet P is used is the maximum medium width direction end position L1 indicated by the alternate long and short dash line in FIG. 13. Here, as shown in FIG. 13, the position of the inner hinge 41 is further to the −Y direction side than is the maximum medium width direction end position L1.

Using a different expression, the inner hinge 41 is disposed to the outside of the medium transport region in the transport path T3, as the first transport path, and in the inversion path T4, as the second transport path, with respect to the widthwise direction, which intersects the transport direction of the sheet P. For this reason, in the printer 10 of the present embodiment, it is possible to suppress sheets P being transported in the transport path T3 and in the inversion path T4 from interfering with the inner hinge 41. It should be noted that in the printer 10 according to this embodiment, the inner hinge 41 is disposed to the outside of the medium transport region in the widthwise direction with respect to both the transport path T3 and the inversion path T4. However, the present disclosure is not limited to such a configuration, and for example, a configuration may be adopted in which the inner hinge 41 is disposed to the outside of the medium transport region in the width direction of one of the transport path T3 and the inversion path T4. However, it is desirable to adopt a configuration in which the inner hinge 41 is disposed to the outside of the medium transport region in the width direction with respect to at least the transport path T3.

Figure 15:
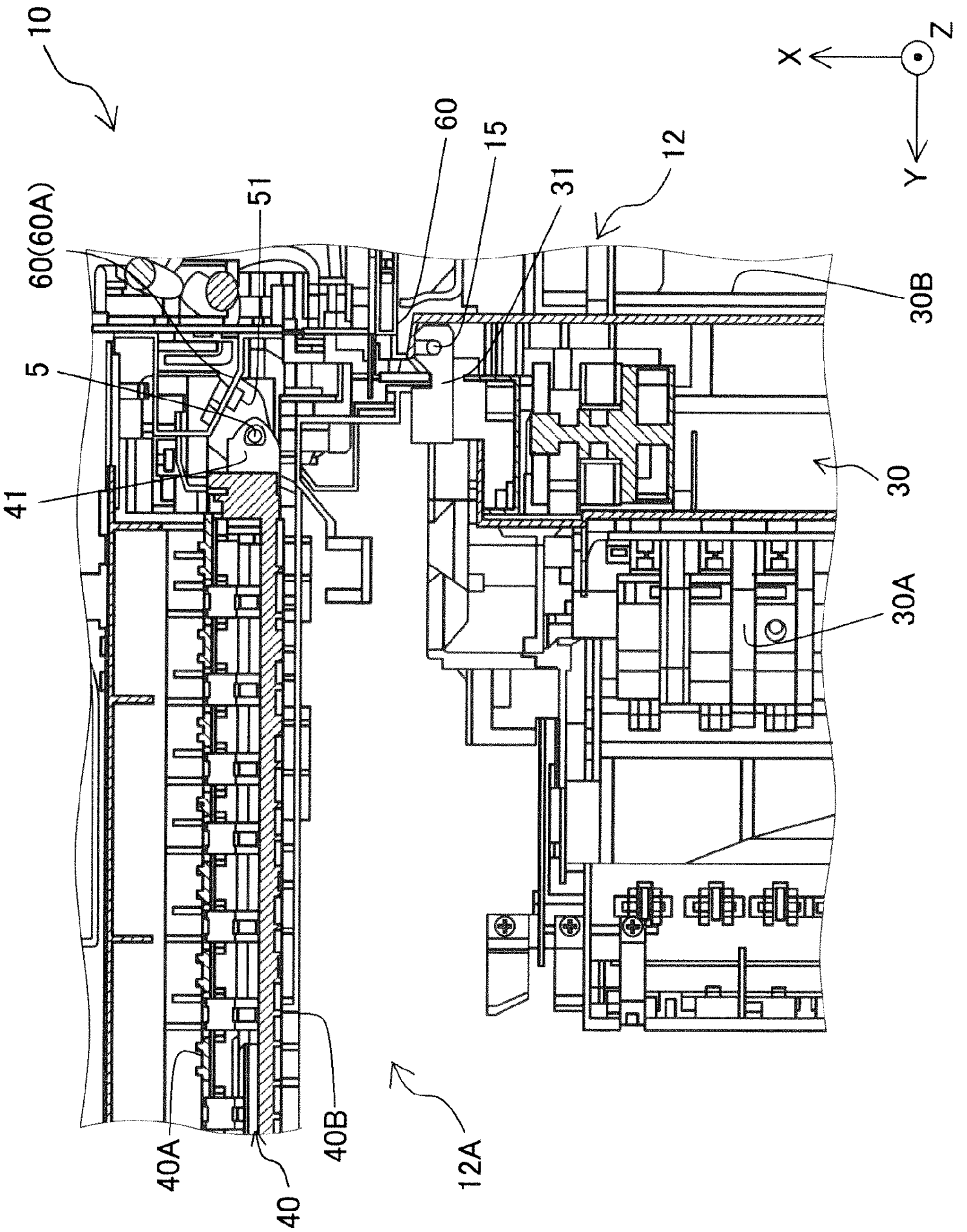
FIG. 15 is a cross-sectional view around an inner hinge and an outer hinge showing a state in which an inner door is closed and an outer door is open.
Figure 16:
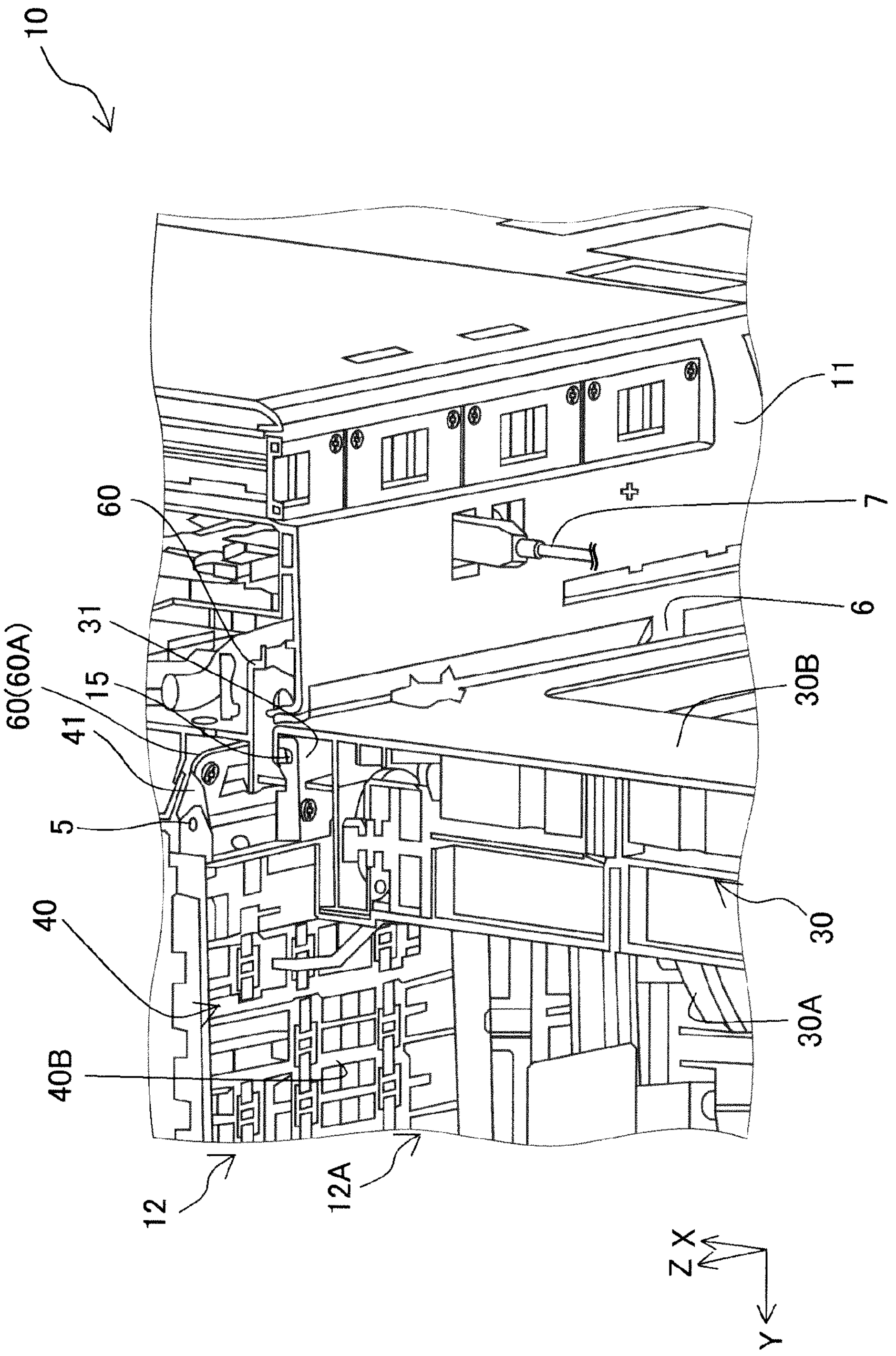
FIG. 16 is a perspective view of the periphery of a regulation section showing a state in which an inner door is closed and an outer door is open.
Figure 17:
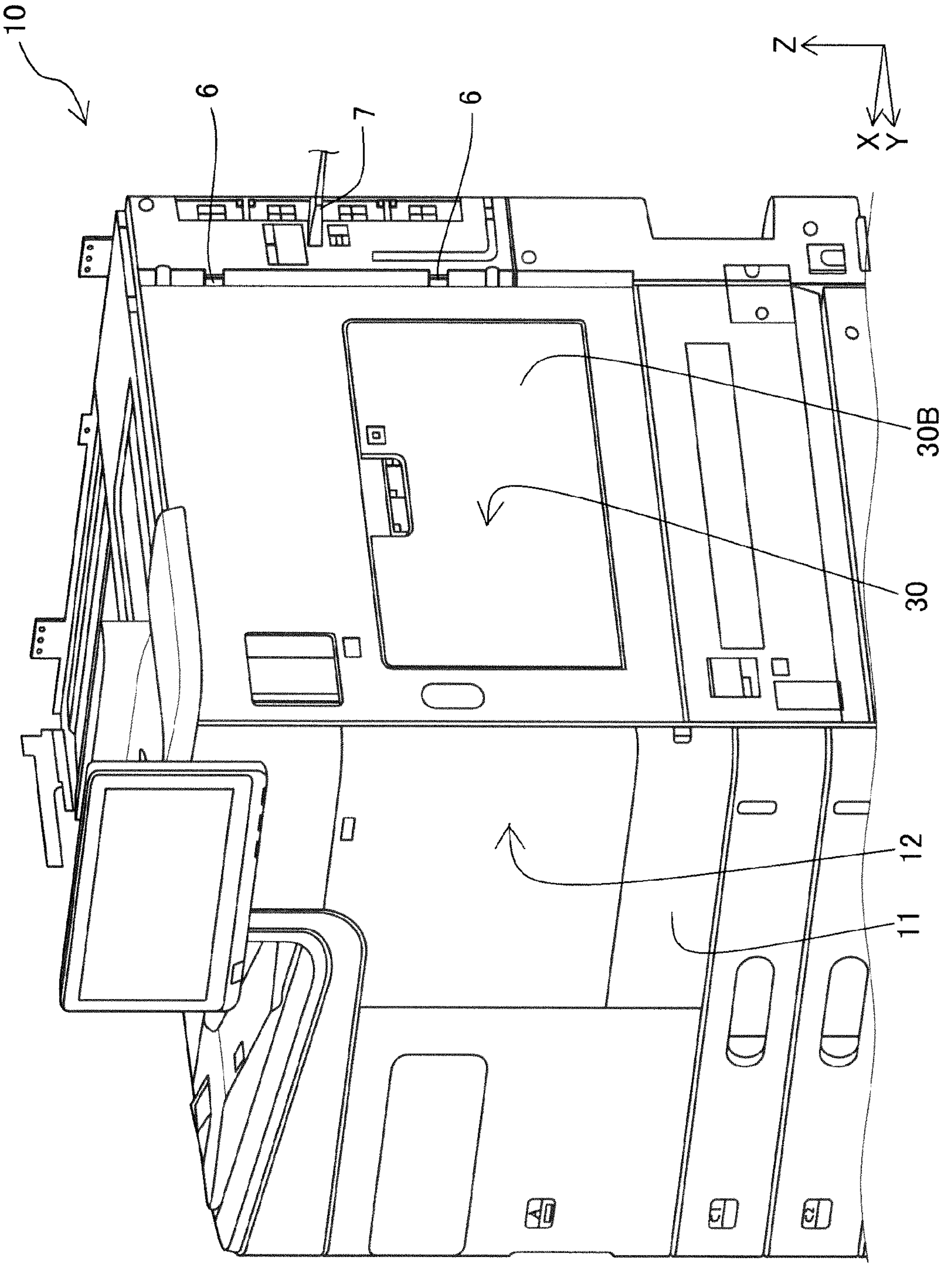
FIG. 17 is a perspective view showing the printer of FIG. 1, as viewed from a regulation section side, in a state in which the inner door and the outer door are closed.

In the printer 10 of the present embodiment, the opening angle of the outer door 30 is restricted. FIG. 15 shows a state in which the outer door 30 is opened to the maximum. Using a different expression, as shown in FIGS. 16 and 17, the printer 10 according to this embodiment includes a regulation section 6 that regulates the opening angle of the outer door 30. For this reason, the printer 10 of the present embodiment has a configuration in which it is possible to suppress the outer door 30 from colliding with an external device, an external wall, or the like because the outer door 30 is excessively opened.

As shown in FIGS. 16 and 17, the printer 10 according to this embodiment has a configuration in which cables such as a USB cable 7 and a power cable can be connected to the case 11. For this reason, by adopting a configuration in which the opening angle of the outer door 30 can be regulated, in the case of a configuration in which a cable or the like is disposed in the case 11 of the device main body 12 as in the printer 10 of the present embodiment, it is also possible to suppress the outer door 30 that is excessively opened from colliding with the cable, a wall around the installation location, or the like. The regulation section 6 of the present embodiment has an X-Z plane, and is configured to be capable of regulating the opening angle of the outer door 30 by abutting the X-Z plane against the opened outer door surface 30B. Note that the configuration of the regulation section 6 is not particularly limited, and in addition to a configuration such as an abutment section with the outer door 30 that suppresses excessive opening of the outer door 30 by abutting against the opened outer door 30 as in the regulation section 6 of the present embodiment, a string-like member, a spring-like member, or the like that suppresses excessive opening of the outer door 30 may be used, or a cable or the like attached to the device main body 12 may have a dual role as the regulation section 6.

In the printer 10 of the present embodiment, the outer door 30 and the inner door 40 are configured and arranged as described above. Since the outer door 30 and the inner door 40 are configured and arranged as described above, the inner door 40 in the closed state configures together with the device main body 12 at least a portion of the transport path T3, which is a first transport path among the transport path of the sheets P. Since the inner door 40 has a dual role as at least a portion of the first transport path, the apparatus configuration can be simplified. In addition, by opening the outer door 30, or opening the inner door 40 together with the outer door 30, it is possible to easily remove a sheet P in a case where a transport failure of the sheet P occurs in the transport path T3, which is a first transport path.

The inner door 40 in the closed state, along with the outer door 30 in the closed state, configures at least a portion of the inversion path T4, which is a second transport path of the transport path of the sheet P. As described above, since the inner door 40 also serves the dual role as at least a portion of the second transport path, the apparatus configuration can be simplified. In addition, by opening the outer door 30, it is possible to easily remove a sheet P in a case where a transport failure of the sheet P occurs in the inversion path T4, which is a second transport path.

Various units and external devices can be connected to the printer 10 of the present embodiment. Here, among the various units, there is a first unit configured to be attached to and detached from the inner opening 12B side by removing the inner door 40 from the device main body 12, and a second unit which can be connected to the first unit from outside the device main body 12 without detaching the inner door 40 from the device main body 12. Examples of the first unit include a medium transport unit 100 (to be described later), a switching unit of the sheet P transport path, a sensor unit, and the like, and examples of the second unit include a post-processing unit 70 (to be described later), a relay unit 81, a discharge tray attached separately from the discharge section 13, a stapler (finisher) unit, and the like. Further, as will be described later, examples of the external device include a stapler device. Examples of attachment of various units and external devices of the printer 10 according to this embodiment will be described in more detail below with reference to FIGS. 18 to 22.

Figure 18:
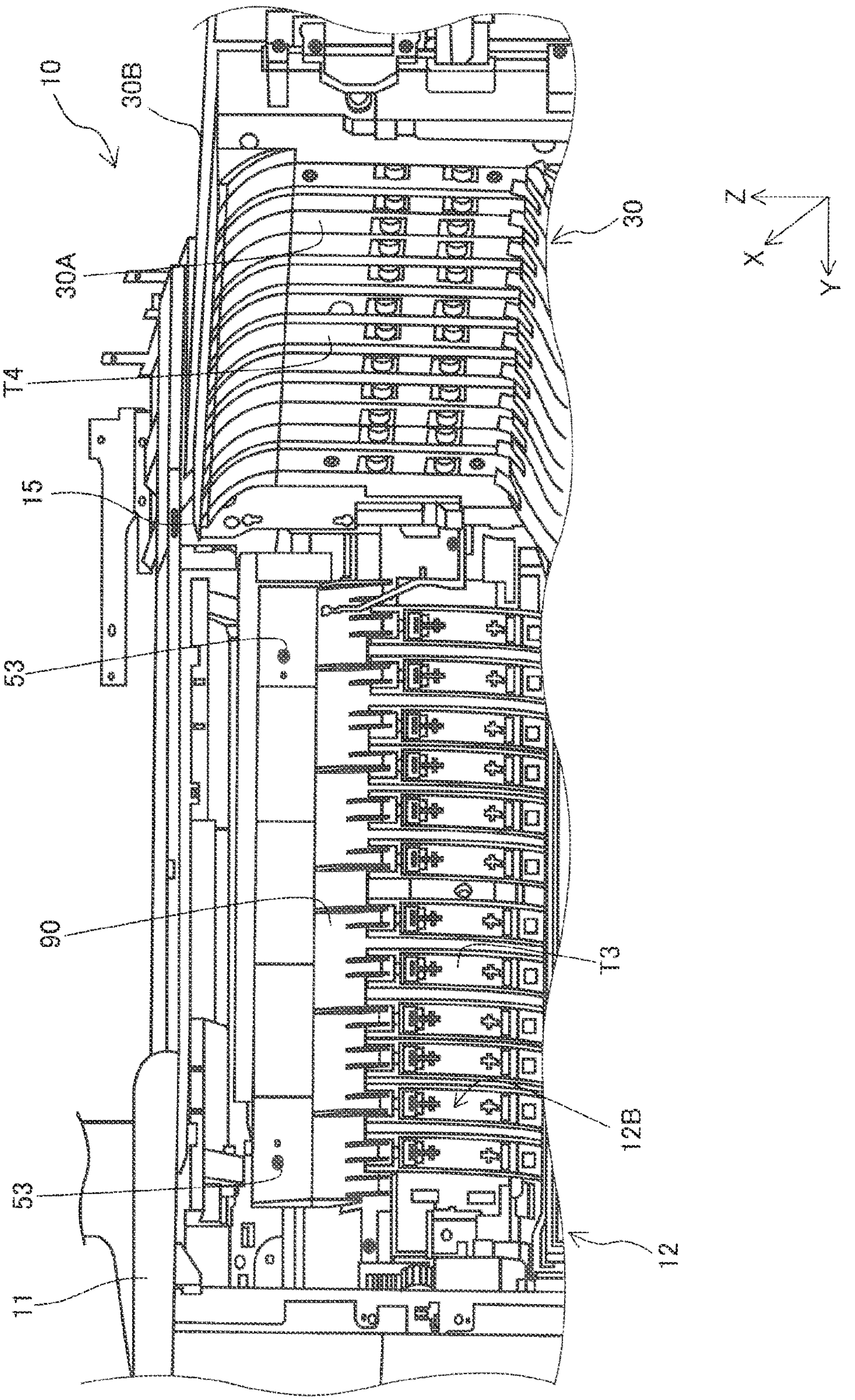
FIG. 18 is a perspective view showing a state in which the inner door is removed from the state of FIG. 3.

As shown in FIG. 18, the inner door 40 can be removed from the device main body 12. When the inner door 40 is to be removed from the device main body 12, the screws 51 for fixing the fixing surface 60A of the frame 60 of the device main body 12 and the flat plate section 410A of the frame fixing section 410 of the inner hinge 41 are removed by using a screw driver, whereby the inner door 40 can be easily removed from the device main body 12, without the screws 51 or the screw driver interfering with the outer door 30 or the like.

As shown in FIG. 18, a first discharge port guide section 90 is provided on the inner opening 12B, which is a region on the +X direction side of the inner door 40, which is the inner side of the inner door 40. The first discharge port guide section 90 serves to guide the discharge direction of the sheet P so that the sheet P transported in the transport path T3 is directed toward the first discharge port E1 and not toward the second discharge port E2. The first discharge port guide section 90 can also be regarded as a first unit. The first discharge port guide section 90 is screwed to the frame 60 of the device main body 12 by the screws 53, and can be easily removed from the device main body 12 as shown in FIG. 19 by using a screwdriver in a state where the inner door 40 has been removed from the device main body 12.

Figure 19:
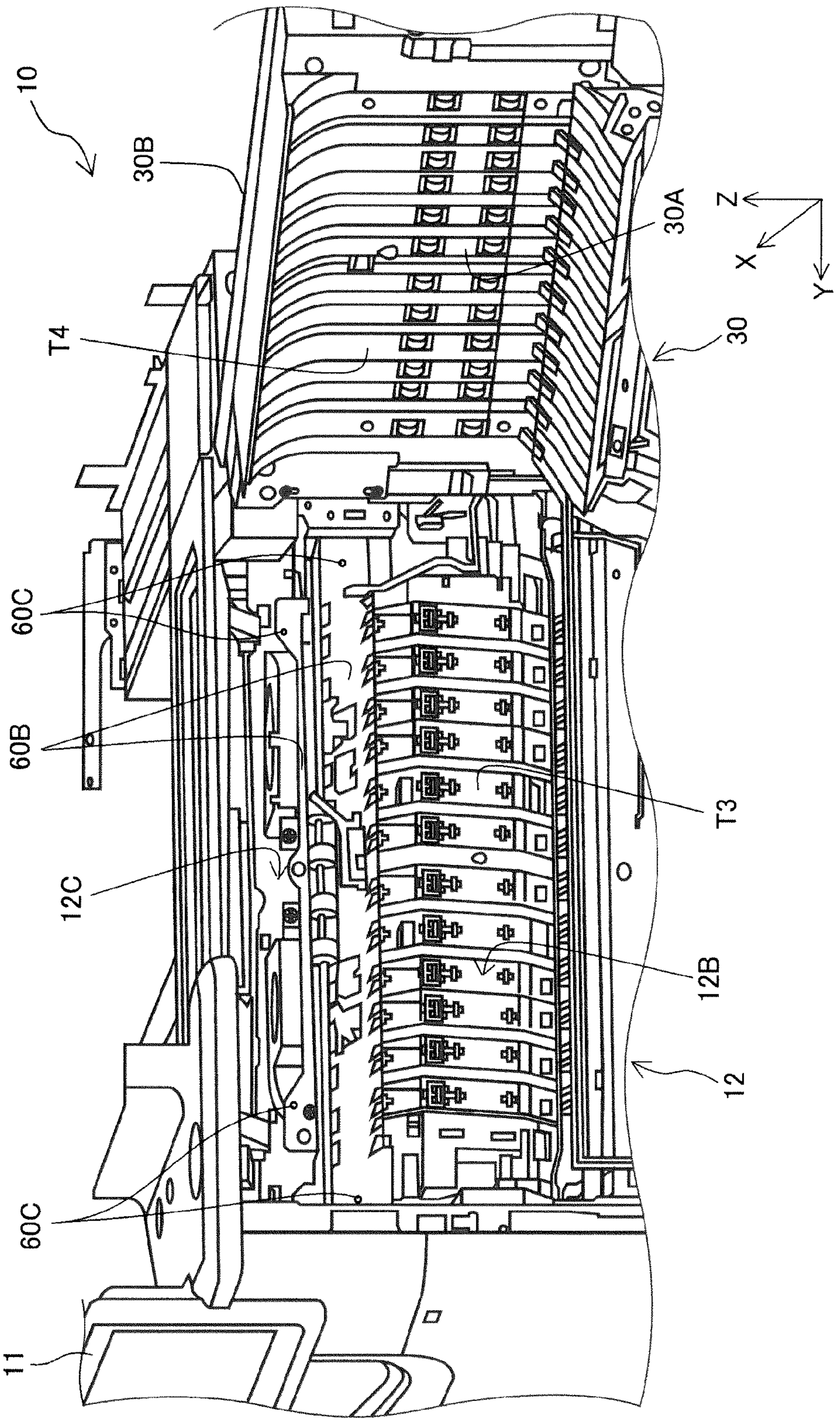
FIG. 19 is a perspective view showing a state in which a first discharge port guide section is removed from the state of FIG. 18.
Figure 20:
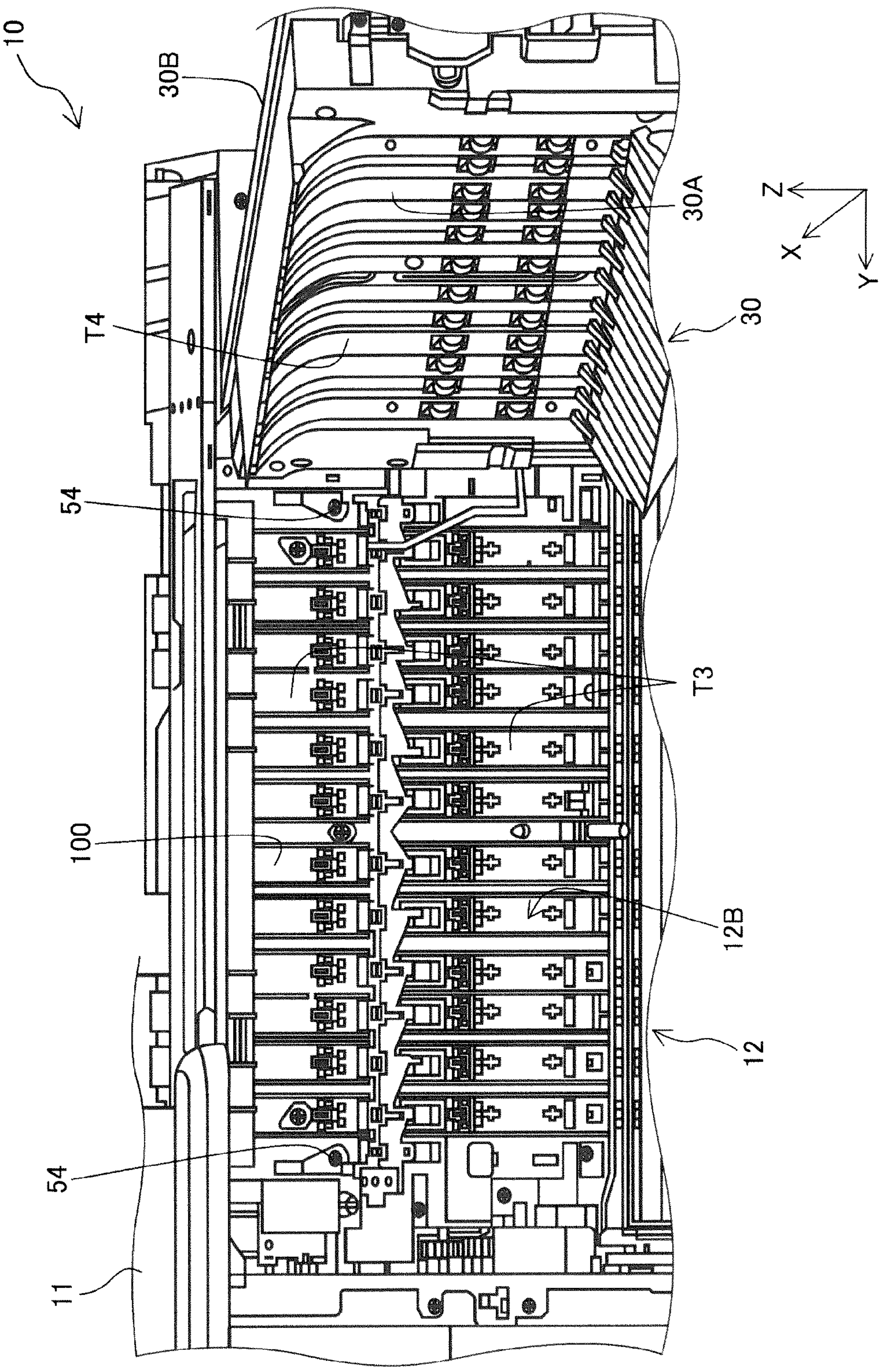
FIG. 20 is a perspective view showing a state in which a medium transport unit is mounted from the state of FIG. 19.

For example, as shown in FIG. 20, the medium transport unit 100 can be attached to the printer 10 that is in the state shown in FIG. 19. Here, the first discharge port guide section 90 can be attached to and detached from a holding section 60B, which serves as the frame 60 provided in the space 12C to the inside of the inner opening 12B. After the first discharge port guide section 90 is removed, the medium transport unit 100 can be attached to the holding section 60B. Specifically, the medium transport unit 100 is attached to the holding section 60B by fitting screws 54 through the medium transport unit 100 and into screw holes 60C formed in the holding section 60B. As will be described later, the medium transport unit 100 also switches the transport path of the sheet P. The unit that can be attached to the printer 10 is not limited to the medium transport unit 100. The medium transport unit 100 according to the present embodiment is configured to be attachable to the device main body 12 in the +X direction via the inner opening 12B, but may be configured to be attachable to the device main body 12 in the –X direction from the outside.

In the printer 10 of the embodiment, since the Y direction lengths of the first discharge port guide section 90 and the medium transport unit 100 are longer than the Y direction length of the inner door 40, the first discharge port guide section 90 cannot be taken out and the medium transport unit 100 cannot be attached unless the inner door 40 is detached from the device main body 12, but the configuration is not limited to this. The configuration may be one in which the Y direction lengths of the first discharge port guide section

90 and the medium transport unit 100 may be shorter than the Y direction length of the inner door 40, and the first discharge port guide section 90 may be pulled out while the inner door 40 is in an open state and the inner door 40 is still attached to the device main body 12, and the configuration may be one in which the medium transport unit 100 can be attached and detached with the inner door 40 in an open state while the inner door 40 is still attached to the device main body 12.

Figure 21:
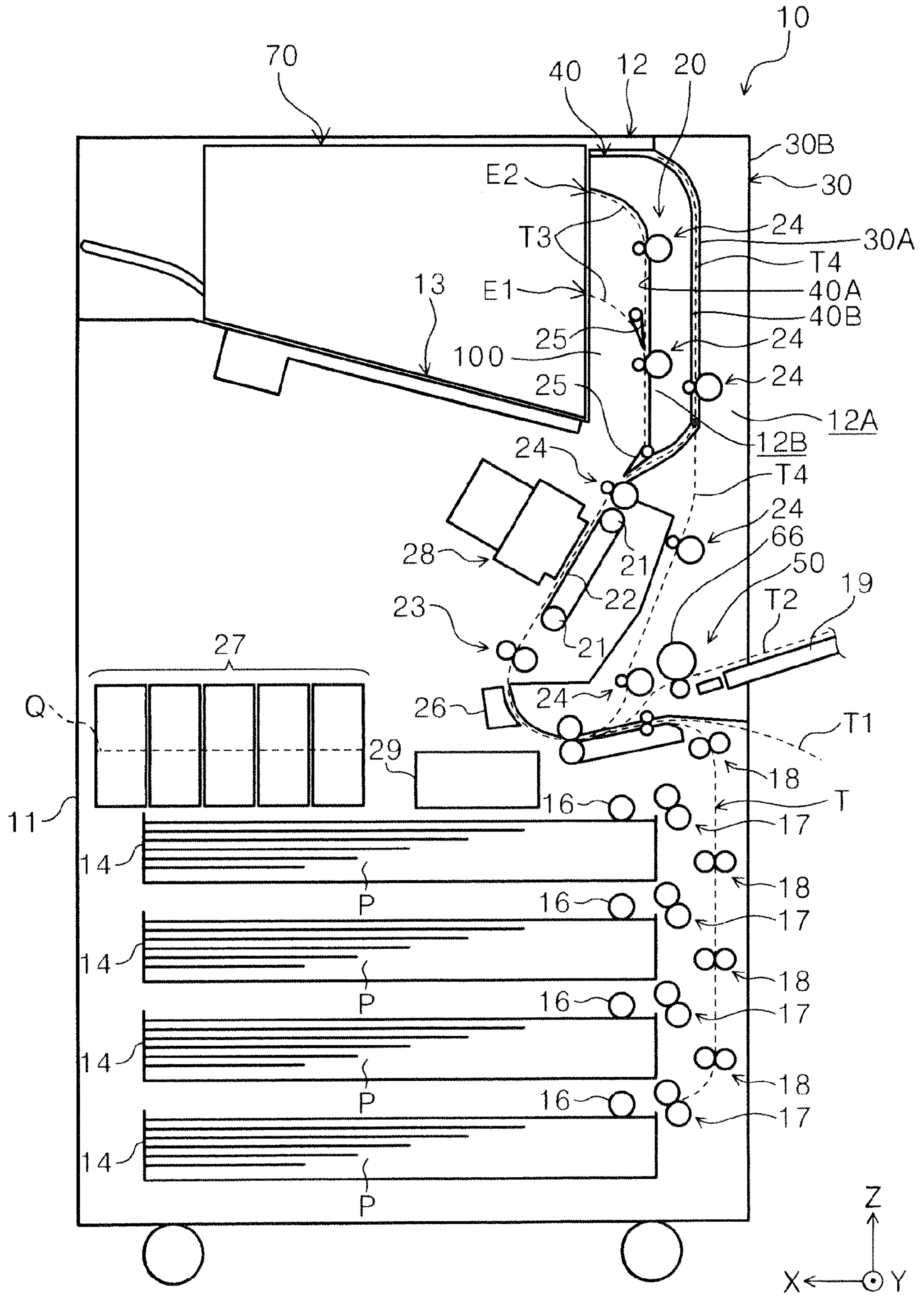
FIG. 21 is a schematic view showing a state in which an option unit is attached to the printer of FIG. 1.

Here, in the printer 10 of the present embodiment, by mounting the medium transport unit 100, it is possible to guide the discharge direction of the sheet P such that the sheet P transported on the transport path T3 is directed toward the second discharge port E2 and not toward the first discharge port E1. Said in opposite terms, when the sheet P is to be discharged toward the first discharge port E1 instead of the second discharge port E2, then the first discharge port guide section 90 is attached. For example, as shown in FIG. 21, a post-processing unit 70, as a second unit to which the transport path is connected, can be attached to the second discharge port E2. The type of the post-processing unit 70 is not particularly limited and, for example, a sensor unit that detects the sheets P, a placement unit on which the discharged sheets P are placed, a drying unit that dries ink ejected onto the sheets P, a stapler unit that can bind a plurality of sheets P together, a unit that can execute a punching process, and the like can be used. The post-processing unit 70 may be attached directly to the device main body 12 instead of to the medium transport unit 100. In this case, the transport path of the post-processing unit 70 may be connected to the first discharge port E1 instead of to the second discharge port E2.

Figure 22:
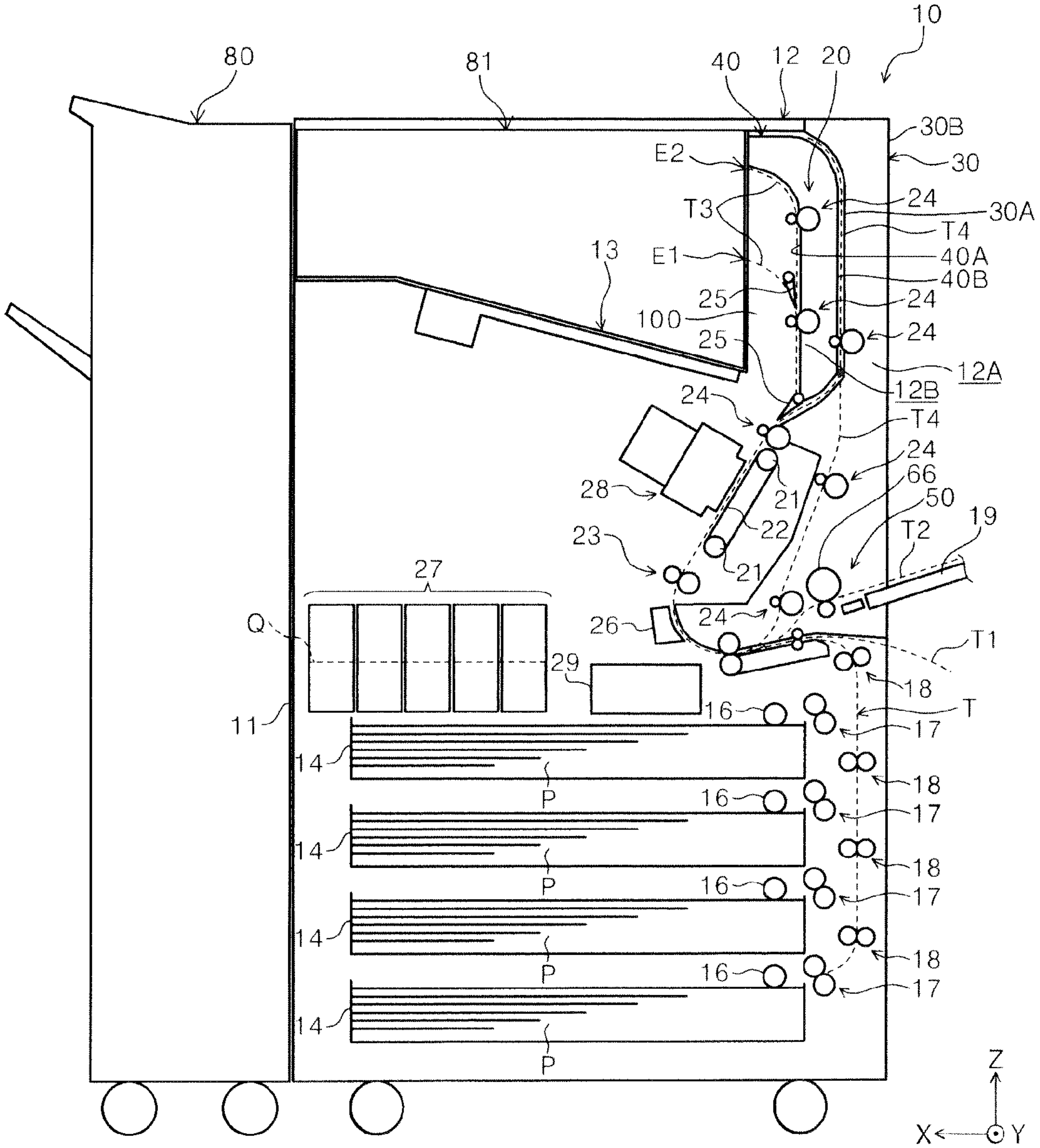
FIG. 22 is a schematic view showing a state in which an external device unit is attached to the printer of FIG. 1.

Here, the entire post-processing unit 70 shown in FIG. 21 can be connected to the device main body 12, and the unit constitutes a portion of the printer 10. On the other hand, as shown in FIG. 22, for example, the printer 10 according to this embodiment may have a configuration in which an external device, which is a device different from the printer 10, can be connected. In FIG. 22, a relay unit 81, as a second unit connected to the first discharge port E1 or to the second discharge port E2, and a post-processor device unit 80, as an external device connected to the relay unit 81, are shown in addition to the printer 10. Here, the relay unit 81 can be regarded as constituting a portion of the printer 10, and can also be regarded as an external device different from the printer 10. Here, for example, it can be considered that the post-processing unit 70 can be mounted on the printer 10, and that the post-processor device unit 80 is installed separately from the printer 10. Similarly to the post-processing unit 70, the type of the post-processor device unit 80 is not particularly limited and, for example, a drying device that dries ink ejected onto the sheets P, a stapler device that can bind a plurality of sheets P together, a device that can execute a punching process, a sewn binding process, or the like can be used.

As described above, the device main body 12 includes the holding section 60B, which holds the first unit that has various configurations, such as the first discharge port guide section 90, and that can be attached and detached by removing the inner door 40. The holding section 60B is disposed on the +X direction side of the inner door 40, that is, with the inner door 40 in the closed state as a reference point, on the opposite side than the outer door 30 in the closed state. In this manner, since the device main body 12 has the holding section 60B for holding the first unit, which can be attached and detached by removing the inner door 40, various first units can be attached to the device main body 12. Although the holding section 60B for the first unit is, with reference to the inner door 40 in the closed state, disposed on the opposite side than the outer door 30 in the closed state, when the first unit is to be attached or detached, the inner door 40 can be easily removed while the outer door 30 is in the open state. In addition, by regarding the printer 10 as one apparatus including the first unit, it is possible to perform various processes on the medium transported to the first unit.

Further, as shown in FIG. 22, the device main body 12 enables connection of the relay unit 81 as the second unit to the medium transport unit 100 as the first unit without the inner door 40 being removed. The medium transport unit 100 is a transport unit that transports sheets P to the relay unit 81. With this configuration, various processes can be performed on the sheet P transported to the second unit via the first unit, by using the second unit or an external device capable of performing a desired process.

As described above, the printer 10 shown in FIG. 22 includes the relay unit 81 as a second unit, and the relay unit 81 is configured to be able to transport sheets P to the post-processor device unit 80 as an external device. Therefore, by adopting such a configuration and using an external device capable of performing desired processing, various types of processing can be performed on the transported sheets P.

The relay unit 81 may be used together with the medium transport unit 100 as in the present embodiment, or may be used instead of the medium transport unit 100. Note that the units and external devices are not particularly limited.

Although the embodiments of the present disclosure are based on the above-described configuration, it is of course possible to change or omit a partial configuration without departing from the gist of the present disclosure. For example, the present disclosure includes a configuration in which an external device such as the post-processor device unit 80 is connected to the second unit, and also includes a configuration in which the second unit can execute desired processing without the external device being connected to the second unit.

What is claimed is:

1. A medium transport device comprising:
- a device main body having a transport path for transporting a medium;
- an outer door; an inner door disposed with respect to the device main body to the inside of the outer door;
- an outer hinge that openably and closably attaches the outer door to the device main body; and
- an inner hinge that openably and closably attaches the inner door to the device main body,
- wherein a pivot axis of the outer hinge and a pivot axis of the inner hinge both extend in a first direction and the outer hinge and the inner hinge overlap when viewed from a direction intersecting an outer door surface of the outer door in a closed state,
- the device main body has a fixing surface which is fixed to the inner hinge, and
- the fixing surface is arranged so as to be inclined at an acute angle with respect to the outer door surface of the outer door in the closed state.

2. The medium transport device according to claim 1, wherein
- the device main body has a fixing surface for fixing the inner hinge by a fixing member and
- the fixing surface is arranged so that when the inner hinge is fixed by the fixing member, the fixing member does not interfere with the outer door in an open state.

3. The medium transport device according to claim 1, further comprising:

a regulation section that regulates an opening angle of the outer door.

4. The medium transport device according to claim 1, wherein the inner door in a closed state, together with the device main body, constitutes at least a portion of a first transport path of the transport path.

5. The medium transport device according to claim 4, wherein the inner hinge is disposed outside a medium transport region of the first transport path, with respect to a width direction, which intersects a transport direction of the medium.

6. The medium transport device according to claim 1, wherein the inner door in a closed state, together with the outer door in the closed state, constitutes at least a portion of a second transport path of the transport path.

7. The medium transport device according to claim 1, wherein the inner door has an attachment surface for the inner hinge, the attachment surface, while the inner door is in a closed state, intersects the outer door surface of the outer door in the closed state and the inner hinge is disposed so that, when viewed from a direction facing the attachment surface for the inner hinge, the inner hinge does not protrude from the attachment surface for the inner hinge.

8. The medium transport device according to claim 1, wherein the device main body includes a holding section configured to hold a first unit that is attachable and detachable after the inner door is removed and the holding section is disposed, with the inner door in the closed state as a reference, on the opposite side than the outer door in the closed state.

9. The medium transport device according to claim 8, further comprising:

the first unit.

10. The medium transport device according to claim 9, wherein the device main body is configured to connect a second unit to the first unit without removing the inner door and the first unit is a transport unit configured to transport the medium to the second unit.

11. The medium transport device according to claim 10, further comprising:

the second unit, wherein the second unit is configured to transport the medium to an external apparatus.

12. The medium transport device according to claim 1, wherein the outer hinge and the inner hinge overlap when viewed from a direction orthogonal to the outer door surface of the outer door in the closed state.

13. A recording apparatus comprising:

the medium transport device according to claim 1 and a recording section configured to perform recording on the medium.

14. A medium transport device comprising:

a device main body having a transport path for transporting a medium;

an outer door; an inner door disposed with respect to the device main body to the inside of the outer door;

an outer hinge that openably and closably attaches the outer door to the device main body; and an inner hinge that openably and closably attaches the inner door to the device main body, wherein a pivot axis of the outer hinge and a pivot axis of the inner hinge both extend in a first direction and the outer hinge and the inner hinge overlap when viewed from a direction intersecting an outer door surface of the outer door in a closed state, and wherein the inner door has an attachment surface for the inner hinge, the attachment surface, while the inner door is in a closed state, intersects the outer door surface of the outer door in the closed state and the inner hinge is disposed so that, when viewed from a direction facing the attachment surface for the inner hinge, the inner hinge does not protrude from the attachment surface for the inner hinge.

* * * * *